US008548528B2

(12) United States Patent  
Kim et al.

(10) Patent No.: US 8,548,528 B2  
(45) Date of Patent: Oct. 1, 2013

(54) MOBILE TERMINAL AND CONTROL METHOD THEREOF

(75) Inventors: Jonghwan Kim, Incheon (KR); Byunghee Hwang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 250 days.

(21) Appl. No.: 12/954,833

(22) Filed: Nov. 26, 2010

(65) Prior Publication Data

US 2011/0124376 A1     May 26, 2011

(30) Foreign Application Priority Data

Nov. 26, 2009   (KR) .................. 10-2009-0115348  
May 24, 2010   (KR) .................. 10-2010-0048144

(51) Int. Cl.  
*H04M 1/00*     (2006.01)

(52) U.S. Cl.  
USPC .............. 455/566; 345/2.2; 345/1.1; 345/1.3; 345/581; 345/592; 345/635; 345/629; 345/176; 345/533; 345/30; 345/33; 345/90; 345/104; 345/108

(58) Field of Classification Search  
USPC ................... 455/566; 345/2.2, 1.1, 1.3, 581, 345/345/592, 635, 629, 176, 533, 30, 33, 345/90, 104, 108  
See application file for complete search history.

(56) References Cited

U.S. PATENT DOCUMENTS

| | | |
|---|---|---|
| 2005/0052341 A1 | 3/2005 | Henriksson |
| 2006/0290679 A1 | 12/2006 | Lii |
| 2008/0282179 A1* | 11/2008 | Kim et al. ............ 715/769 |

FOREIGN PATENT DOCUMENTS

| | | |
|---|---|---|
| EP | 1990711 A2 | 11/2008 |
| KR | 10-2009-0035667 A | 4/2009 |
| WO | WO 2009/081469 A1 | 7/2009 |
| WO | WO 2009/094944 A1 | 8/2009 |

* cited by examiner

*Primary Examiner* — Kwasi Karikari  
(74) *Attorney, Agent, or Firm* — Birch, Stewart, Kolasch & Birch, LLP

(57) ABSTRACT

A mobile terminal including a touch pad; a first display unit including a transparent display; a second display unit including a non-transparent display disposed below the transparent display; and a controller configured to selectively control the first and second display units to operate in a dual-operation mode by controlling at least a portion of the first display unit to be transparent and not display information and controlling the second display unit to display information that can be viewed through the at least the portion of the first display unit that is transparent.

22 Claims, 49 Drawing Sheets

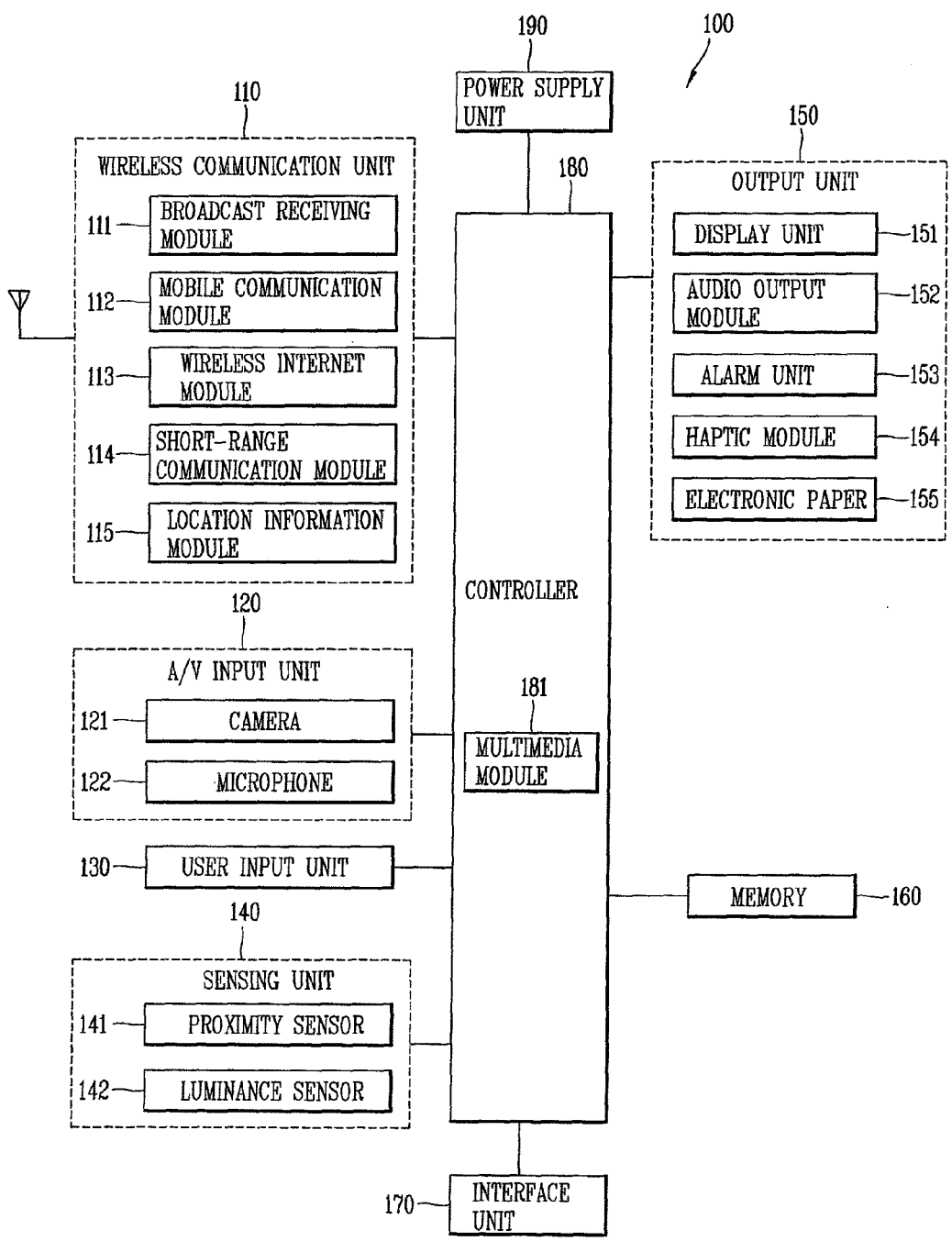

FIG. 8
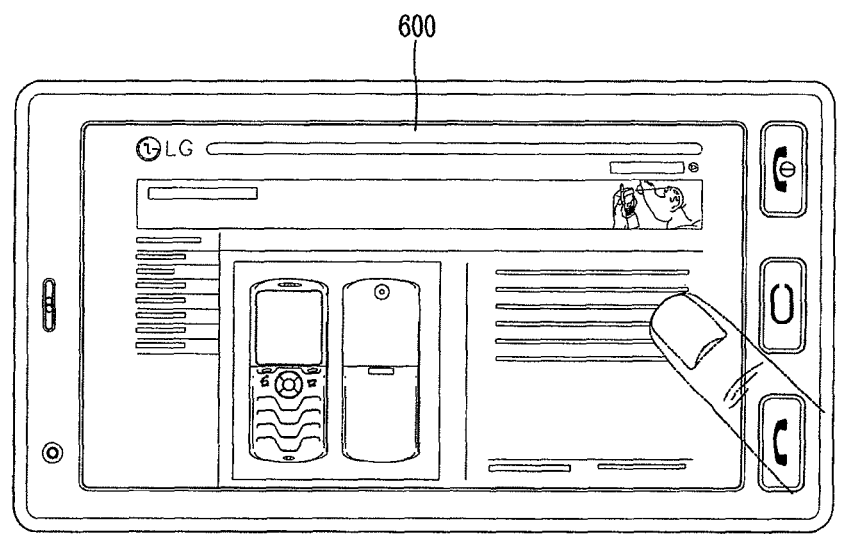
(a)
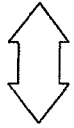
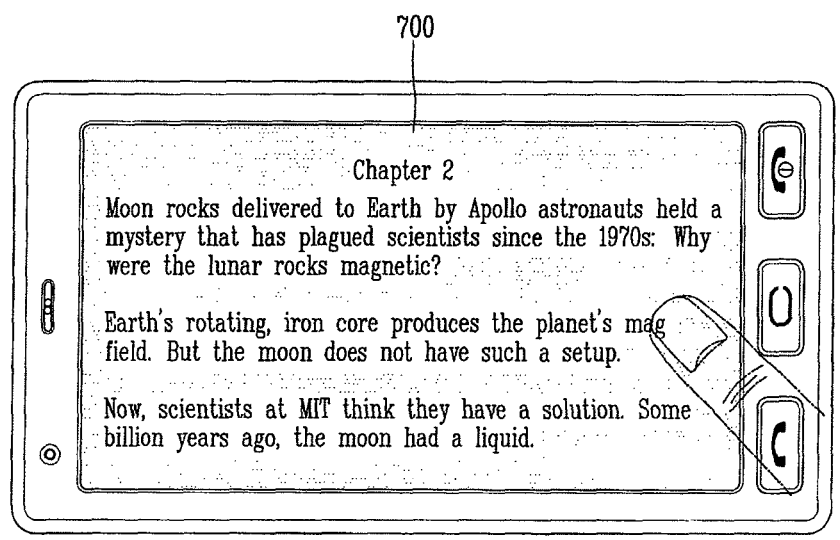
(b)

MOBILE TERMINAL AND CONTROL METHOD THEREOF

CROSS-REFERENCE TO A RELATED APPLICATION

Pursuant to 35 U.S.C. §119(a), this application claims the benefit of earlier filing date and right of priority to Korean Application No. 10-2009-0115348, filed on Nov. 26, 2009 and Korean Application No. 10-2010-0048144, filed on May 24, 2010, the contents of which is incorporated by reference herein in its entirety.

BACKGROUND OF THE INVENTION

1. Field of the Invention

The present disclosure relates to a mobile communication terminal having a dual display unit and a method of displaying data in the terminal, and more particularly, to a method of displaying data in a mobile communication terminal having a dual display unit in which various user interfaces are provided by using a display unit using a transparent display and an electronic paper (e-paper).

Furthermore, the present disclosure relates to a mobile communication terminal having the display structure overlapped with a transparent display and a non-transparent display, and a control method thereof.

2. Description of the Related Art

In general, mobile terminals can be easily carried and have one or more of functions such as supporting voice and video telephony calls, inputting and/or outputting information, storing data and the like. As it becomes multifunctional, furthermore, the mobile terminal can be allowed to capture still or videos, play music or video files, play games, receive broadcast and the like, so as to be implemented as an integrated multimedia player.

Various new attempts have been made for the multimedia devices in the aspects of hardware or software in order to implement such complicated functions. For example, a user interface environment is provided for the user to easily and conveniently retrieve or select functions. For the functional support and enhancement of such a mobile terminal, it may be considered to improve the structural and/or software aspects of the mobile terminal.

In general, for a mobile communication terminal, a liquid crystal display device is used, and in more recent years an organic light emitting diode (OLED) is also used as a display unit thereof. As various functions are supported by the mobile terminal in recent years, there has been increased the requirement for developing more visible and convenient user interfaces for the user.

SUMMARY OF THE INVENTION

The present disclosure is contrived to solve the foregoing problem, and one aspect of the present invention is to provide a mobile communication terminal having a dual display unit in which various user interfaces are provided by using a display unit using a transparent display and an electronic paper (e-paper), and a method of displaying data in the terminal.

Another aspect of the present invention is to provide a mobile communication terminal having the display structure overlapped with a transparent display and a non-transparent display, and a control method thereof.

In order to solve the foregoing problem, a mobile terminal having a dual display unit according to an embodiment of the present invention may include a touch pad; a first display unit including a transparent display; a second display unit including a non-transparent display; and a controller configured to control to select an object displayed on either one of the first and the second display unit or display a predetermined screen on either one display when generating a touch input through at least any one of the first display unit, the second display unit, and the touch pad.

Furthermore, it is characterized in that the non-transparent display may be an electronic paper, and the controller may control to display a predetermined first screen on the first display unit, drive the second display unit when receiving a predetermined touch input implemented on the first display unit, and display a predetermined second screen on the second display unit.

Furthermore, it is characterized in that the first and the second display unit may be overlapped with each other, and the touch pad may be adhered to the first and the second display unit, respectively, and the controller may control to select an object displayed on the first display unit or select an object displayed on the second display unit according to a method of receiving a touch input when displaying an object in an overlapped manner on the first and the second display unit.

Furthermore, it is characterized in that the controller may control to display a predetermined first screen on the first display unit, drive the second display unit while controlling not to output electrical signals for displaying visual information on a partial or entire portion of the transparent display when receiving a predetermined touch input implemented on the first display unit, and display a predetermined second screen on the second display unit.

Furthermore, it is characterized in that the predetermined touch input may be a long touch or preset touch gesture.

Furthermore, it is characterized in that the controller may control to display at least either one of multimedia data such as videos, color images and the like, and text data on the first screen, and may control to display the multimedia data on the first display unit and display text data on the second display unit when receiving a predetermined touch input in the text data or multimedia data on the first screen.

Furthermore, it is characterized in that the controller may control to display at least either one of multimedia data such as videos, color images and the like, and text data having link information or Uniform Resource Locator (URL) information on the first screen, and may control to display the first screen as a three-dimensional screen on the first display unit and display text data linked to the text data on the first screen via a link or URL on the second display unit when receiving a predetermined touch input in the text data or multimedia data on the first screen.

Furthermore, it is characterized in that the controller may control to display the first screen and second screen at the same time to the outside in proportion to a distance generated by a touch-and-drag entered on an edge of the first screen displayed on the first display unit or the second screen displayed on the second display unit.

Furthermore, it is characterized in that the controller may control to display a predetermined menu on the second display unit, and drive the first display unit while at the same time displaying an application execution screen based on a touch input on the first display unit when receiving a predetermined touch input for selecting the predetermined menu.

Furthermore, it is characterized in that the controller may control to change an execution screen displayed on the transparent display unit by at least one or more touch inputs.

Furthermore, it is characterized in that the controller may control to change the execution screen to a three-dimensional screen based on consecutive two touch inputs for a predetermined time entered on the execution screen.

Furthermore, it is characterized in that the controller may control to copy the execution screen with a first touch-and-drag, and move the copied execution screen by a second touch-and-drag distance with a subsequent second touch-and-drag for a predetermined time entered on the execution screen.

Furthermore, it is characterized in that the controller may be configured to select an object displayed on either one preset display based on a touch pressure when receiving a touch input.

Furthermore, it is characterized in that the controller may be configured to select an object displayed on either one preset display based on a touch time when receiving a touch input.

Furthermore, it is characterized in that the controller may be configured to select an object displayed on either one side display by receiving a touch input, and select an object displayed on the other side display using at least any one input unit of a keypad, a jog wheel, a track ball, and a joystick.

Furthermore, it is characterized in that the controller may be configured to select an object displayed on either one side display by receiving a touch input, and select an object displayed on the other side display based on the inclination direction or movement direction of the terminal.

Furthermore, it is characterized in that the controller may be configured to select an object displayed on either one preset display based on a touch gesture when receiving a touch input.

Furthermore, it is characterized in that the controller may be configured to select an object displayed on either one preset display based on a fingerprint of the touched finger when receiving a touch input.

Furthermore, it is characterized in that the controller may be configured to divide a touch region into at least two regions, thereby selecting an object displayed on the first display when touching one side region, and selecting an object displayed on the second display when touching the other side region.

A method of controlling a mobile terminal according to an embodiment of the present invention may include receiving a touch input from a user; and selecting an object displayed either one of a first display unit and a second display unit or displaying a predetermined screen on either one display unit thereof when generating the touch input.

Furthermore, it is characterized in that said displaying a predetermined screen on the either one display unit may include displaying a predetermined first screen on the first display including a transparent display; receiving a predetermined first signal based on the movement of an object in contact with or in proximity to a predetermined region on the first display unit; and responding to the predetermined first signal to drive the second display unit made of electronic paper and display a predetermined second screen on the second display unit.

Furthermore, it is characterized in that the first and the second display unit may be overlapped with each other, and said selecting an object displayed on the either one display unit may include selecting an object displayed on the first display based on the method of receiving a touch input, when an object is displayed on the first and the second display in an overlapped manner; and selecting an object displayed on the second display based on the method of receiving a touch input.

Furthermore, it is characterized in that the method may further include not outputting electrical signals for displaying visual information on a partial or entire portion of the transparent display in response to the predetermined first signal.

Furthermore, it is characterized in that the predetermined region on the first display unit may be a region where text data on the first screen is located, and said responding to the predetermined first signal to drive the second display unit made of electronic paper and display a predetermined second screen on the second display unit may be not outputting electrical signals for displaying text data on the first screen on the second display unit and displaying visual information (data) on the transparent display located at a region displayed with text data on the second display unit.

Furthermore, it is characterized in that multimedia data such as videos, color images and the like, and text data may be displayed on the first screen, and said responding to the predetermined first signal to drive the second display unit made of electronic paper and display a predetermined second screen on the second display unit may be displaying the multimedia data on the first display unit and displaying text data on the second display unit in response to a predetermined first signal based on a long touch or predetermined touch gesture input to text data or multimedia data of the first screen.

Furthermore, it is characterized in that multimedia data such as videos, color images and the like, and text data may be displayed on the first screen, and said responding to the predetermined first signal to drive the second display unit made of electronic paper and display a predetermined second screen on the second display unit may be displaying the first screen as a three-dimensional screen on the first display unit and displaying text data linked to the text data on the first screen via a link or URL on the second display unit in response to a predetermined first signal based on a long touch or predetermined touch gesture input to text data or multimedia data of the first screen.

Furthermore, it is characterized in that the method may further include receiving a predetermined second signal based on the movement of an object in contact with or in proximity to a predetermined region on the first display unit; and displaying the first screen and second screen at the same time to the outside in proportion to a distance generated by a touch-and-drag entered on an edge of the first screen or the second screen in response to the predetermined second signal.

Furthermore, it is characterized in that an object displayed on either one preset display may be selected based on a touch pressure when receiving a touch input in case of displaying an object in an overlapped manner on the first and the second display unit.

Furthermore, it is characterized in that an object displayed on either one preset display may be selected based on a touch time when receiving a touch input in case of displaying an object in an overlapped manner on the first and the second display unit.

Furthermore, it is characterized in that the method may further include selecting an object displayed on either one side display by receiving a touch input, and selecting an object displayed on the other side display using another input unit.

Furthermore, it is characterized in that the another input unit may include at least any one of a keypad, a jog wheel, a track ball, and a joystick.

Furthermore, it is characterized in that the method may further include selecting an object displayed on either one side display by receiving a touch input, and selecting an object displayed on the other side display based on the inclination direction or movement direction of the terminal in case of displaying an object in an overlapped manner on the first and the second display unit.

Furthermore, it is characterized in that an object displayed on either one preset display may be selected based on a touch gesture when receiving a touch input in case of displaying an object in an overlapped manner on the first and the second display unit.

Furthermore, it is characterized in that the touch gesture is entered shape that can be continuously drawn at a time without releasing the received touch input.

Furthermore, it is characterized in that an object displayed on either one preset display may be selected based on a fingerprint of the touched finger when receiving a touch input in case of displaying an object in an overlapped manner on the first and the second display unit.

Furthermore, it is characterized in that a touch region may be divided into at least two regions in case of displaying an object in an overlapped manner on the first and the second display unit, thereby selecting an object displayed on the first display when touching one side region, and selecting an object displayed on the second display when touching the other side region.

A method of controlling a mobile terminal having a dual display unit according to still another embodiment of the present invention may include displaying a predetermined menu on an electronic paper; driving a transparent display unit when receiving a predetermined touch input for selecting the predetermined menu; and displaying an application execution screen based on the touch signal on the transparent display unit.

Furthermore, it is characterized in that the method may further include changing an execution screen displayed on the transparent display unit by at least one or more touch inputs.

Furthermore, it is characterized in that said changing an execution screen displayed on the transparent display unit by at least one or more touch inputs may be changing the execution screen to a three-dimensional screen based on consecutive two touch inputs for a preset time entered on the execution screen.

Furthermore, it is characterized in that said changing an execution screen displayed on the transparent display unit by at least one or more touch inputs may be copying the execution screen by a first touch-and-drag, and moving the copied execution screen by a second touch-and-drag distance with a subsequent second touch-and-drag for a predetermined time entered on the execution screen.

According to a mobile communication terminal having a dual display unit of the present invention and a method of displaying data in the terminal, multimedia data such as color images, videos, and the like is displayed on a transparent display, and text data is displayed on an electronic paper using a dual display unit provided with a display unit including the transparent display (for example, transparent OLED) and the electronic paper (e-paper), thereby providing a screen with a three-dimensional effect to the user. Furthermore, text data is displayed on the electronic paper even when the transparent display is turned off, thereby reducing power consumption.

In addition, according to a mobile terminal associated with at least one embodiment of the present invention having the foregoing configuration, an object displayed on either one display may be selected based on the method of receiving a user's touch input in a mobile terminal having the display structure overlapped with a transparent display and a non-transparent display.

Moreover, according to the present invention, an object displayed on either one display may be selected based on a touch gesture, a fingerprint, or a touch region in a mobile terminal having the display structure overlapped with a transparent display and a non-transparent display.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal associated with according to an embodiment of the present invention;

FIGS. 8 through 10 are image views illustrating a method of changing a display screen of the dual display unit according to a first embodiment of the present invention;

DETAILED DESCRIPTION OF THE INVENTION

Figure 2A:
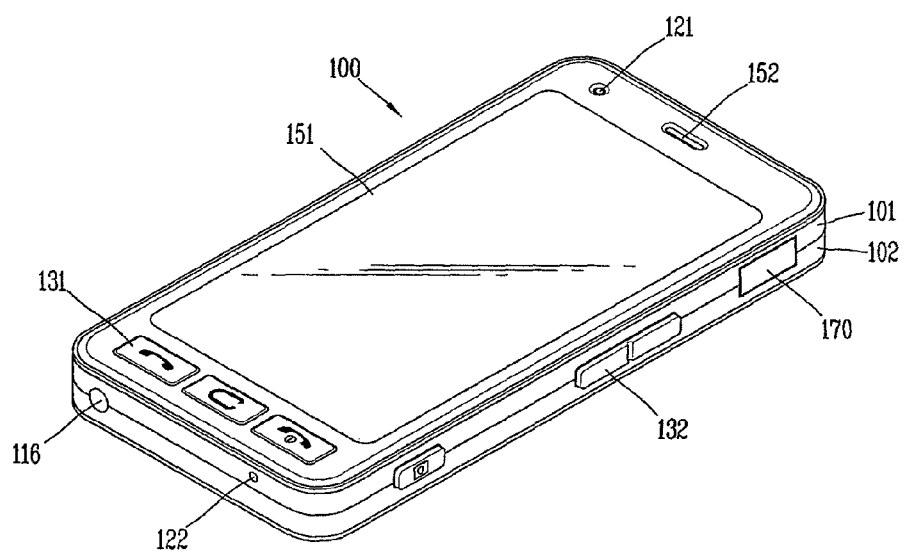
FIG. 2A is a front perspective view illustrating a mobile terminal associated with an embodiment of the present invention.

Hereinafter, a mobile communication terminal associated with the present invention will be described in more detail with reference to the accompanying drawings. A suffix "module" or "unit" used for constituent elements disclosed in the following description is merely intended for easy description of the specification, and the suffix itself does not give any special meaning or function.

A mobile communication terminal disclosed herein may include a portable phone, a smart phone, a laptop computer, a digital broadcast terminal, a personal digital assistant (PDA), a portable multimedia player (PMP), a navigation, and the like.

However, it would be easily understood by those skilled in the art that a configuration disclosed herein may be also applicable to stationary terminals such as a digital TV, a desktop computer, and the like, excluding constituent elements particularly configured for mobile communication terminals.

FIG. 1 is a block diagram illustrating a mobile communication terminal associated with an embodiment of the present invention.

The mobile communication terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the constituent elements will be described in sequence.

The wireless communication unit 110 typically includes one or more elements allowing radio communication between the mobile communication terminal 100 and a wireless communication system, or allowing radio communication between radio communication the mobile communication terminal 100 and a network in which the mobile communication terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile communication terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile communication terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile communication terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile communication terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile communication terminal 100 such as an opened or closed state of the mobile communication terminal 100, a location of the mobile communication terminal 100, an orientation of the mobile communication terminal 100, and the like, and generates a sensing signal for controlling the operation of the mobile communication terminal 100. For example, when the mobile communication terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile communication terminal 100. For example, when the mobile communication terminal 100 is in a phone call mode, the display unit 151 may display a User Interface (UI) or a Graphic User Interface (GUI) associated with a call. When the mobile communication terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have an interlayer structure, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the portable terminal 100.

Electronic paper 155 is a display device in which a typical feature of ink is applied to paper, which is also called e-paper. Contrary to a conventional flat display that uses a back light for allowing pixels to emit light, electronic paper uses reflective light as typical paper. Subsequent to changing an image, therefore, texts and images can be displayed without power consumption. Furthermore, electronic paper can be folded or bent contrary to a flat display. The electronic paper will be described later.

The memory 160 may store a program for processing and controlling the controller 180. Alternatively, the memory 160 may temporarily store input/output data (e.g., phonebook data, messages, audios, still images, videos, and the like). The memory 160 may concurrently store usage frequency for each data element (e.g., each phone number, a message, each multimedia, etc.). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile communication terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180.

A light-emitting unit 195 is disposed at a side of electronic paper to automatically emit light when certain data is displayed on the electronic paper 155. Light-emitting diodes (LEDs) may be used for the light-emitting unit 195. On the other hand, when data is displayed on the electronic paper 155 while luminance less than a predetermined value is measured by a luminance sensor, the light-emitting unit may be turned on.

Various embodiments described herein may be implemented in a computer-readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

FIG. 2A is a front perspective view illustrating an example of a mobile communication terminal associated with the present invention.

The mobile communication terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (e.g., 131, 132), a microphone 122, an interface 170, and the like may be arranged on the terminal body, mainly on the front case 101. The arrangement relationship of the electronic paper and the display unit 151 will be described later.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content inputted by the manipulation units 131, 132 may be set in various ways. For example, the first manipulation unit 131 may be used to receive a command, such as start, end, scroll, or the like, and the second manipulation unit 132 may be used to receive a command, such as controlling a volume level being outputted from the audio output unit 152, or switching it into a touch recognition mode of the display unit 151.

Figure 2B:
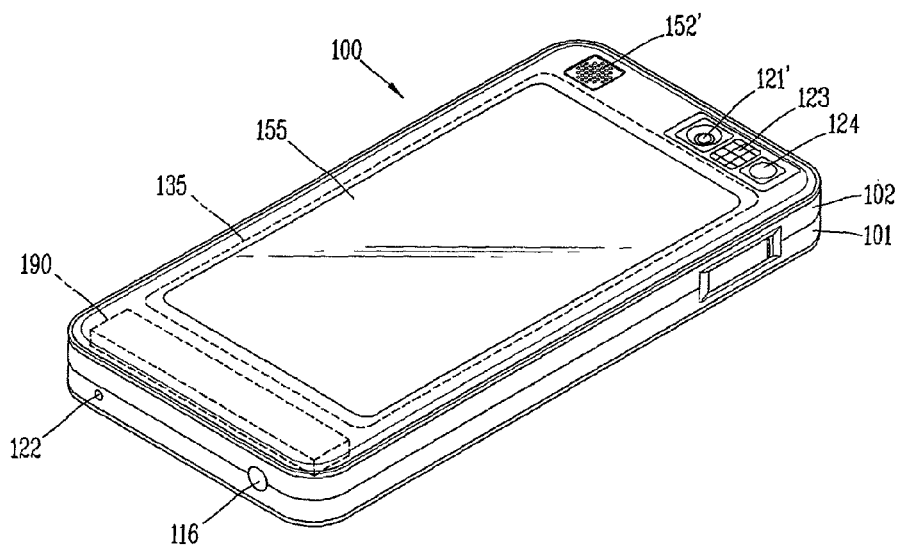
FIG. 2B is a rear perspective view illustrating a mobile terminal associated with an embodiment of the present invention.

FIG. 2B is a rear perspective view illustrating a mobile communication terminal illustrated in FIG. 2A.

Referring to FIG. 2B, a camera 121' may be additionally mounted on a rear surface of the terminal body, namely, the rear case 102. The camera 121' has an image capturing direction, which is substantially opposite to the direction of the camera 121 (refer to FIG. 2), and may have different pixels from those of the first video input unit 121.

For example, it is preferable that the camera 121 has a relatively small number of pixels enough not to cause a difficulty when the user captures his or her own face and sends it to the other party during a video call or the like, and the camera 121' has a relatively large number of pixels since the user often captures a general object that is not sent immediately. The cameras 121, 121' may be provided in the terminal body in a rotatable and popupable manner.

Furthermore, a flash 123 and a mirror 124 may be additionally disposed adjacent to the camera 121'. The flash 123 illuminates light toward an object when capturing the object with the camera 121'. The mirror 124 allows the user to look at his or her own face, or the like, in a reflected way when capturing himself or herself (in a self-portrait mode) by using the camera 121'.

Furthermore, an audio output unit 152' may be additionally disposed on a rear surface of the terminal body. The audio output unit 152' together with the audio output unit 152 (refer to FIG. 2A) can implement a stereo function, and it may be also used to implement a speaker phone mode during a phone call.

Furthermore, an antenna for receiving broadcast signals may be additionally disposed on a lateral surface of the terminal body. The antenna 124 constituting a broadcast receiving module 111 (refer to FIG. 1) may be provided so as to be pulled out from the terminal body.

Furthermore, a power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch or an electronic paper 155 for displaying data may be additionally mounted on the rear case 102. The touch pad 135 may be also configured with an optical transmission type, similarly to the display unit 151. In this case, if the display unit 151 and the electronic paper 155 are configured to display visual information on both surfaces thereof, then visual information displayed on the electronic paper 155 may be recognized through the touch pad 135. All the information displayed on the both surfaces may be controlled by the touch pad 135. Alternatively, a display or electronic paper is additionally mounted on the touch pad 135, and thus a touch screen may be also disposed on the rear case 102.

The touch pad 135 may be operated in conjunction with the display unit 151 of the front case 101 and the electronic paper 155 of the rear case 102. The touch pad 135 may be disposed in parallel at a rear side of the display unit 151. The touch pad 135 may have the same size as or a smaller size than the display unit 151.

Displaying Data Using Electronic Paper

First, a mobile communication terminal for providing various user interfaces using a display unit using a transparent display and an electronic paper according to an embodiment of the present invention and a method of displaying data in the terminal will be described below.

Figure 3:
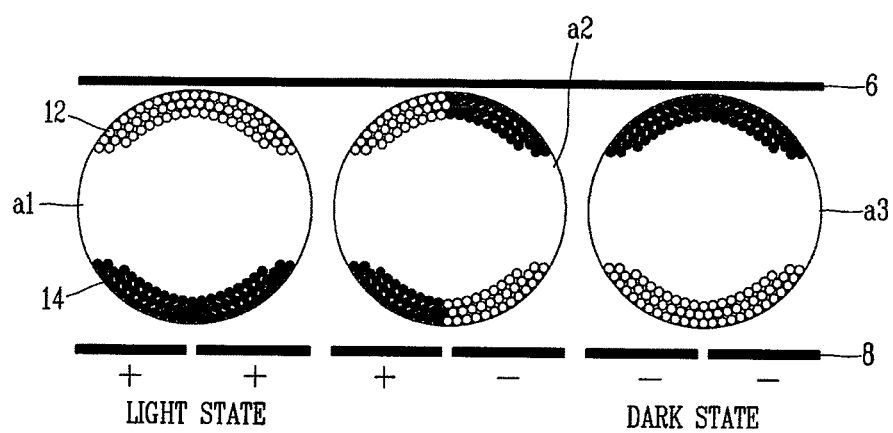
FIG. 3 is a view for explaining the principle of an electronic paper associated with an embodiment of the present invention.

FIG. 3 is a view for explaining the principle of operating an electronic paper 155 mounted on a mobile communication terminal according to an embodiment of the present invention. FIG. 3 is a cross-sectional view illustrating electronic ink microcapsules (a1, a2, a3). As illustrated in the drawing, the electronic paper 155 may include a top transparent electrode 6, a bottom electrode 8, and an electronic ink capsule 10. Positive charged white pigment chips 12 and negative charged white pigment chips 14 are disposed in the electronic ink capsule 10.

When the bottom electrode is charged with positive electricity the white pigment chips 12 moves to the top transparent electrode 6, thereby allowing the electronic ink capsule 10 to show white. On the contrary, when charged with negative electricity the black pigment chips 14 moves to the top transparent electrode 6, thereby allowing the electronic ink capsule 10 to show black. The electronic paper 155 including such numerous electronic ink capsules 10 may act as a display unit. Furthermore, one electronic ink capsule 10 can show black and white at the same time. In this case, a half of the pixel on the bottom electrode 8 is charged with negative electricity, and the remaining half thereon is charged with positive electricity.

In this manner, the electronic paper 155 is a new type of display device, called electronic ink. Furthermore, the electronic paper can implement color videos through combining polymer coating technology and solution chemistry. 30 frames per second animation or actuality film can be also displayed.

Hereinafter, referring to FIG. 4, the operation method of a display unit 151, a touch pad 135, and an electronic paper 155 in an associated manner will be described.

FIG. 4 is a cross-sectional view illustrating a dual display unit for explaining an example of driving a dual display unit for a touch input in a mobile communication terminal having a dual display unit according to the present invention.

A dual display unit 151, 155 may include a display unit 151 using a transparent display (for example, TOLED) and a display unit using an electronic paper 155. Hereinafter, according to the present invention, the display unit using a transparent display (TOLED) is referred to as a transparent display, and the display unit using an electronic paper 155 is referred to as an electronic paper. Various visual information may be displayed on the dual display unit. Such information may be displayed in the form of a character, a numeral, a symbol, an icon, or the like.

As illustrated in FIG. 4, as an example of the structure of a dual display unit, an electronic paper 155, a touch pad 135, and a transparent display unit 151 may be sequentially stacked to form an interlayer.

Figure 4A:
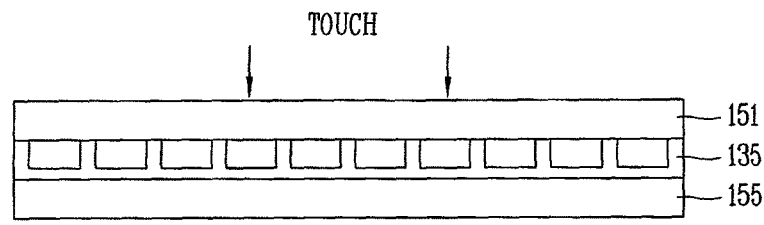
FIG. 4 is a cross-sectional view illustrating a dual display unit for explaining an example of driving a dual display unit for a touch input in a mobile communication terminal having a dual display unit according to the present invention.

Referring to FIG. 4A, when power is first applied to a mobile communication terminal through the power supply unit 190, the controller 180 supplies power to both or either one of the dual display unit to display a main screen on the electronic paper 155 and/or transparent display unit 151. If the controller 180 displays a preset main screen on the transparent display unit 151 and electronic paper 155, respectively, then the controller recognizes that a touch region has been selected through the touch pad 135 as a predetermined touch input is implemented by the user on the transparent display unit 151 though an input device.

Then, the controller 180 determines whether the touch input has selected visual information displayed on the transparent display unit 151 or has selected visual information displayed on the electronic paper 155 by determining a type (kind) of the predetermined touch input, and furthermore, determines on which one of the transparent display unit 151 and electronic paper 155 an application should be carried out.

Figure 4B:
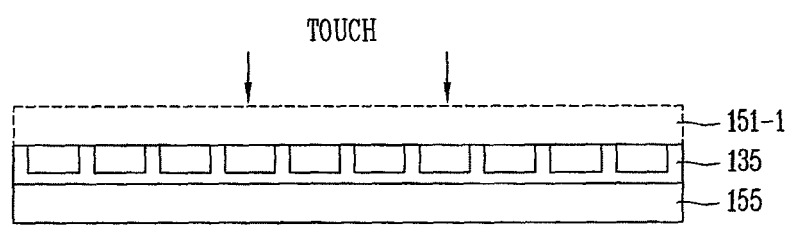

Referring to FIG. 4B, when power is first applied to a mobile communication terminal through the power supply unit 190, the controller 180 may configure the transparent display unit 151 as a transparent operation mode (hereinafter, transparent) 151-1, and display visual information (for example, main screen) on the electronic paper 155. Here, the transparent operation mode of the transparent display unit 151 denotes a state that electrical signals for displaying data on the transparent display (for example, TOLED) constituting a pixel are not applied in the state of the transparent display unit 151 being turned off or the transparent display unit 151 being turned on. In other words, as electrical signals for displaying data on the transparent display are not applied, visual information such as a character, an image, and the like is not displayed, thereby becoming a transparent state.

As a result, in the transparent operation mode, visual information displayed on the transparent display unit 151 placed below the transparent display unit 151 is displayed to the outside. Here, if the user makes a predetermined touch input in a region with visual information displayed on the electronic paper 155, then the controller recognizes that the relevant region has been selected through the touch pad 135.

In this case, the controller 180 may determine that the transparent display unit 151 is currently set to a transparent operation mode and also determine that the predetermined touch input selects visual information of the electronic paper 155. Furthermore, the controller may determine on which one of the transparent display unit 151 and electronic paper 155 an application based on the touch input should be implemented.

Figure 4C:
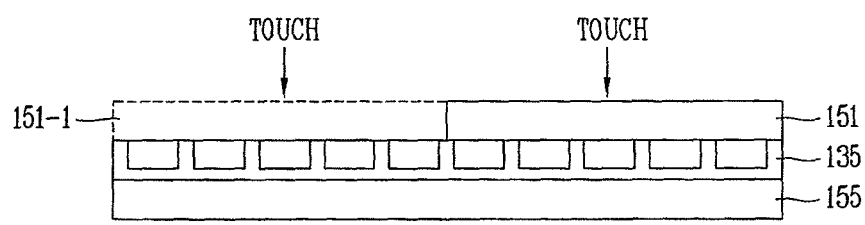

Referring to FIG. 4C, the controller may set some pixels of the transparent display unit 151 to a transparent operation mode, and apply electrical signals for displaying visual information to the remaining pixels thereof not set to a transparent operation mode, thereby displaying predetermined data. In other words, the controller divides a partial portion of the transparent display unit to be set to an operation mode (transparent or active), and the function of a touch input based on the operation mode is same as in FIGS. 4A and 4B, and therefore, the description thereof will be omitted.

Hereinafter, a method of displaying data in a mobile communication terminal having a dual display unit will be described.

Figure 5:
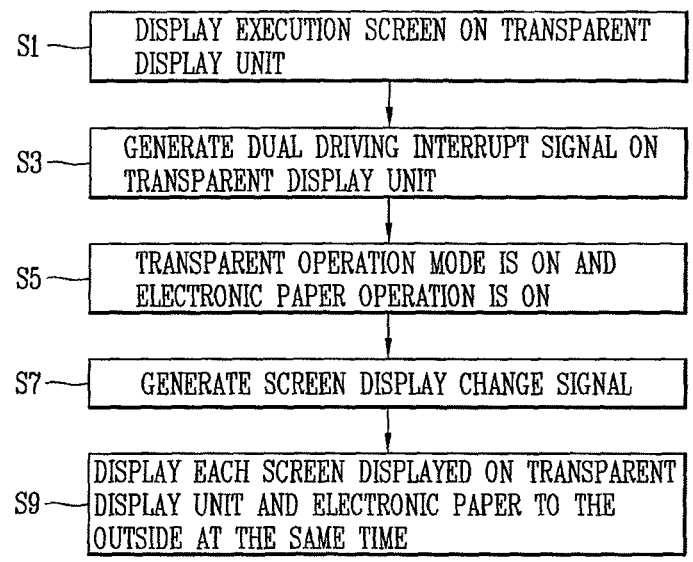
FIG. 5 is a flow chart illustrating a method of displaying data in a mobile communication terminal having a dual display unit according to a first embodiment of the present invention.

FIG. 5 is a flow chart illustrating a method of displaying data in a mobile communication terminal having a dual display unit according to a first embodiment of the present invention.

As illustrated in FIG. 5, when power is first applied to a mobile communication terminal through the power supply unit 190, the controller 180 displays a main screen on the transparent display unit 151, and an execution screen of the selected application is displayed if a predetermined signal is entered into visual information (menu, icon, etc.) displayed on the main screen (S1). Here, it is assumed that the controller does not drive the electronic paper 155.

Then, if the generation of a dual mode driving interrupt signal entered by a touch to the transparent display unit 151 or a user input unit is detected (S3), then the controller 180 switches the transparent display unit 151 to a transparent operation mode while at the same time turning on the electronic paper 155 (S5). As a result, it will be in a state that the user can view visual information displayed on the electronic paper 155.

Here, the dual mode driving interrupt signal is a signal for driving the transparent display unit or electronic paper that has been turned off in a state of only either one of the dual display unit being turned on.

The dual mode driving interrupt signal may be generated by a long touch or a preset touch gesture input to the touch pad formed as an interlayer between the transparent display unit 151 and the electronic paper 155. Furthermore, it may be generated by a preset hot key through the user input unit 130.

Then, if the input of a screen display change signal is detected in a state that the transparent display unit 151 and electronic paper 155 are turned on by the dual mode driving interrupt signal (S7), then the controller 180 displays a first screen on the transparent display unit 151 while at the same time displaying the first screen and a second screen displayed on the electronic paper 155 to the outside based on the screen display change signal (S9). A specific application example according to the screen display change signal will be described in detail with reference to FIGS. 9 and 10.

As a result, in case of using a dual display unit, independent information can be displayed on both screens of the dual display unit, respectively, compared to a case of using a signal display unit, thereby allowing the user to conveniently access a lot of information through screen change.

Figure 6:
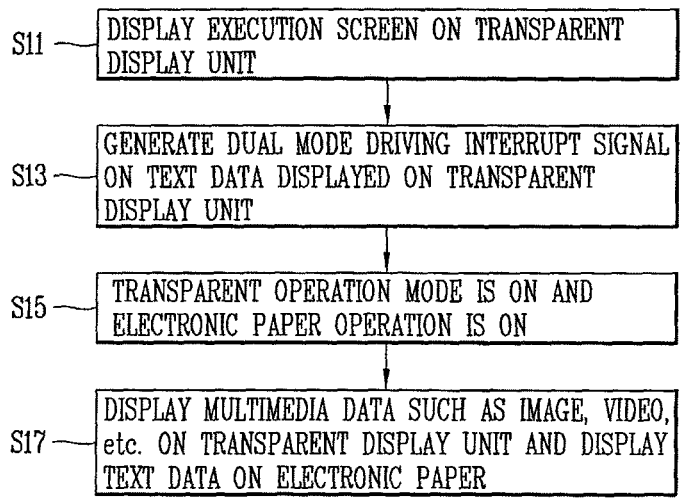
FIG. 6 is a flow chart illustrating a method of displaying data in a mobile communication terminal having a dual display unit according to a second embodiment of the present invention.

FIG. 6 is a flow chart illustrating a method of displaying data in a mobile communication terminal having a dual display unit according to a second embodiment of the present invention.

As illustrated in FIG. 6, when power is first applied to a mobile communication terminal through the power supply unit, the controller 180 displays a main screen on the transparent display unit 151, and an execution screen of the selected application is displayed if a predetermined signal is entered to visual information (menu, icon, etc.) displayed on the main screen (S11).

Then, if the user enters a dual mode driving interrupt signal into a location where text data is displayed on the transparent display unit 151. The controller 180 detects that a dual mode driving interrupt signal has been received on text data displayed on the transparent display unit 151 (S13), and switches the transparent display unit 151 to a transparent operation mode while at the same time turning on the electronic paper 155 (S15).

Then, in a state that the transparent display unit 151 and electronic paper 155 are turned on by the dual mode driving interrupt signal, the controller 180 displays multimedia data having a three-dimensional effect and colors among multimedia data such as color images, videos, and the like, and text data, on the transparent display unit 151, and displays the text data on the electronic paper 155 (S17). A specific application example according to a dual mode driving interrupt signal entered on text data displayed on the transparent display unit 151 will be described in detail with reference to FIGS. 11 and 12.

In a mobile communication terminal having a dual display unit, the controller 180 displays multimedia data on the transparent display unit and displays text data on the electronic paper, thereby allowing the user to view a screen with a three-dimensional effect.

Figure 7:
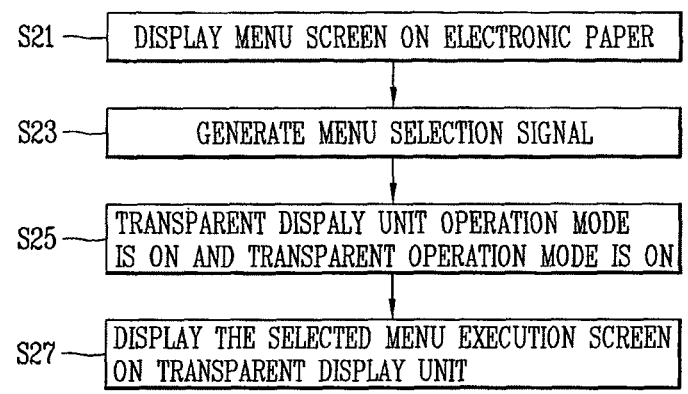
FIG. 7 is a flow chart illustrating a method of displaying data in a mobile communication terminal having a dual display unit according to a third embodiment of the present invention.

FIG. 7 is a flow chart illustrating a method of displaying data in a mobile communication terminal having a dual display unit according to a third embodiment of the present invention.

As illustrated in FIG. 7, when power is first applied to a mobile communication terminal through the power supply unit 190, the controller 180 displays a main screen on the electronic paper 155, and predetermined visual information (menu, icon, etc.) is displayed on the main screen (S21). Then, when the generation of a dual mode driving interrupt signal entered by a touch on the touch screen or a user input unit is detected by the controller 180 (S23), then the controller 180 turns on the transparent display unit 151, and sets the transparent display unit 151 to a transparent operation mode (S25). Then, the selected application execution screen is displayed on the transparent display unit 151 (S27). Here, various application examples in which the selected application execution screen is displayed on the transparent display unit 151 will be described in detail with reference to FIGS. 13 through 20.

The controller may turn off the transparent display unit (transparent operation mode), and display visual information on the electronic paper, and implement the transparent display unit only when executing the selected application, thereby reducing the power consumption of a mobile communication terminal.

Hereinafter, various application examples according to a first embodiment of the present invention for displaying independent information on both screens of a dual display unit, respectively, and allowing the user to conveniently approach to information displayed on the dual display unit according to a first embodiment of the present invention will be described.

[First Application Example of the First Embodiment]

FIG. 8 is a first application example illustrating the screen switching of a dual display unit by a dual mode driving interrupt signal according to a first embodiment of the present invention.

As illustrated in FIG. 8A, the controller 180 displays a predetermined first screen 600 (here, web screen) by a predetermined application execution command on the transparent display unit 151. If the user wants to see a screen displayed with another information (for example, a screen displayed with text data or the like that has been previously seen) through the electronic paper 155 while surfing a web, then a dual mode driving interrupt signal is entered on the transparent display unit 151. Here, the location on which the dual mode driving interrupt signal is entered may be any location on the transparent display unit 151. The controller 180 displays a dual mode setting icon (not shown) on the transparent display unit 151 and detects a predetermined signal on the dual mode setting icon, thereby recognizing that a dual mode driving interrupt signal has been received.

As illustrated in FIG. 8B, the controller 180 determines that a dual mode driving interrupt signal has been entered, and switches the transparent display unit 151 to a transparent operation mode while at the same time turning on the electronic paper 155 to display a predetermined second screen 700 on the electronic paper 155. In other words, if the input of the dual mode driving interrupt signal is detected, then the controller 180 controls electrical signals for displaying data not to be applied to a transparent display (TOLED) of the transparent display unit 151. As a result, the transparent display unit 151 is in a transparent state, and the electronic paper 155 is turned on while at the same time the predetermined second screen 700 displayed on the electronic paper is displayed to the outside.

Also, if the controller 180 determines that a dual mode driving interrupt signal has been entered in a state that a predetermined second screen 700 is displayed on the electronic paper 155 as illustrated in FIG. 8B, then the controller 180 may turn on the transparent display unit 151 (when the state of the transparent display unit has been turned off) and display a predetermined first screen 600 as illustrated in FIG. 8A.

[Second Application Example of the First Embodiment]

FIG. 9 is a second application example illustrating the screen switching of a dual display unit by a screen display change signal according to a first embodiment of the present invention.

Figure 9A:
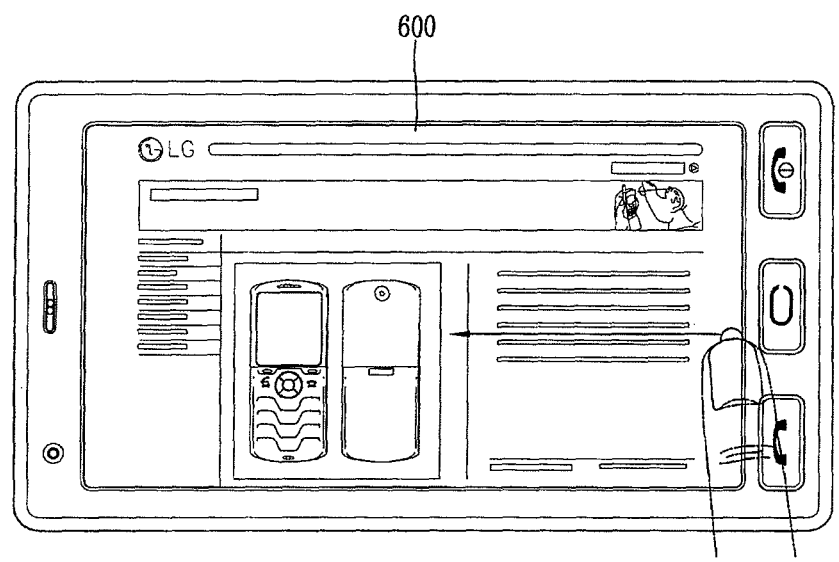

As illustrated in FIG. 9A, the controller 180 controls such that only a predetermined first screen 600 displayed on the transparent display unit 151 is displayed to the outside in a state of driving both screens of a dual display unit. Here, the user performs a touch-and-drag using an input device (here, finger) on an edge of the first screen to display a predetermined second screen displayed on the electronic paper 155 to the outside.

Figure 9B:
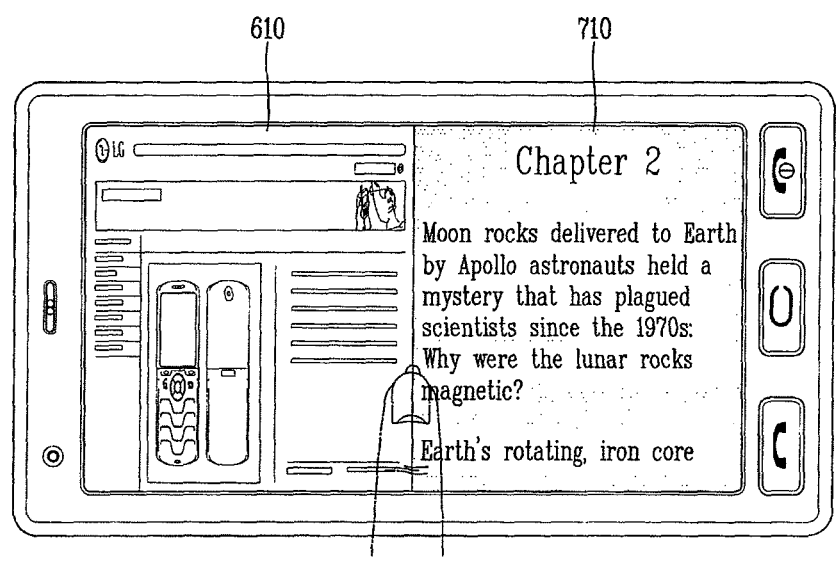

Next, as illustrated in FIG. 9B, the controller 180 changes the size of a predetermined first screen 610 displayed on the transparent display unit 151 in proportion to a distance generated by a touch-and-drag to display the predetermined first screen 610 to the outside as well as display a predetermined second screen 710 displayed on the electronic paper 155 to the outside.

Figure 9C:
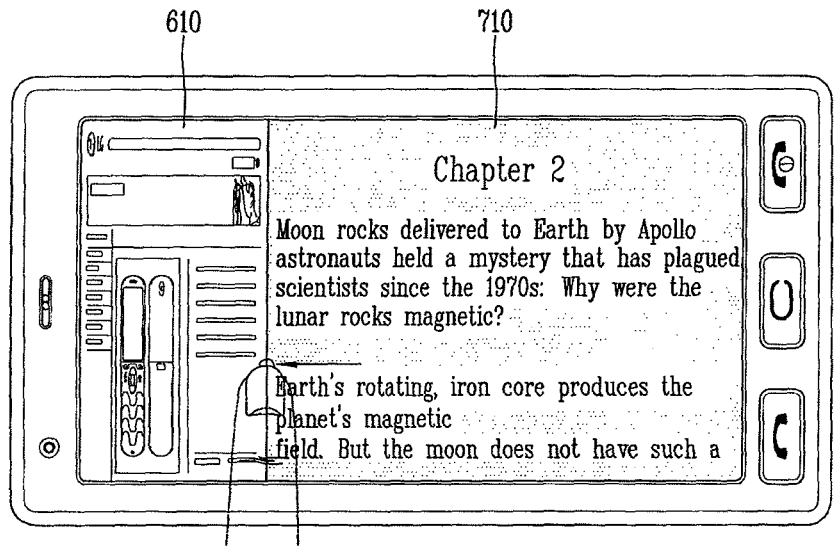
Figure 9D:
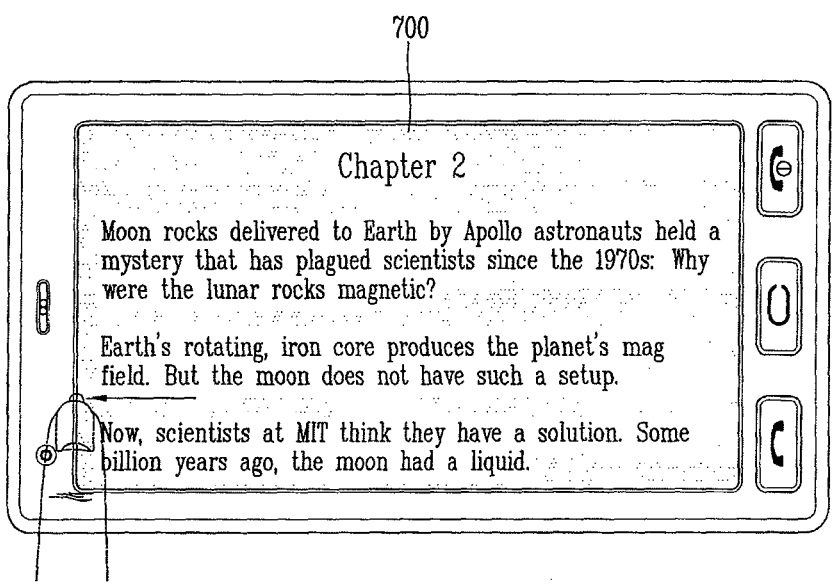

Similarly, the controller may divide a predetermined first screen 610 displayed on the transparent display unit and a predetermined second screen 700, 710 displayed on the electronic paper in proportion to a distance generated by a touch-and-drag to display to the outside at the same time (see FIGS. 9c and 9d).

Here, the controller 180 controls a transparent display (TOLED) region of the electronic paper 155 overlapped with a predetermined second screen 700, 710 displayed to the outside on the electronic paper 155 to be in a transparent operation mode to maintain a transparent state, thereby allowing the predetermined second screen 700, 710 to be displayed to the outside.

[Third Application Example of the First Embodiment]

FIG. 10 is a third application example illustrating the screen switching of a dual display unit by a screen display change signal according to a first embodiment of the present invention.

As illustrated in FIG. 10, it is an application example in which the user performs a touch-and-drag in a reversed direction through an input device (finger), compared with FIG. 9.

Figure 10A:
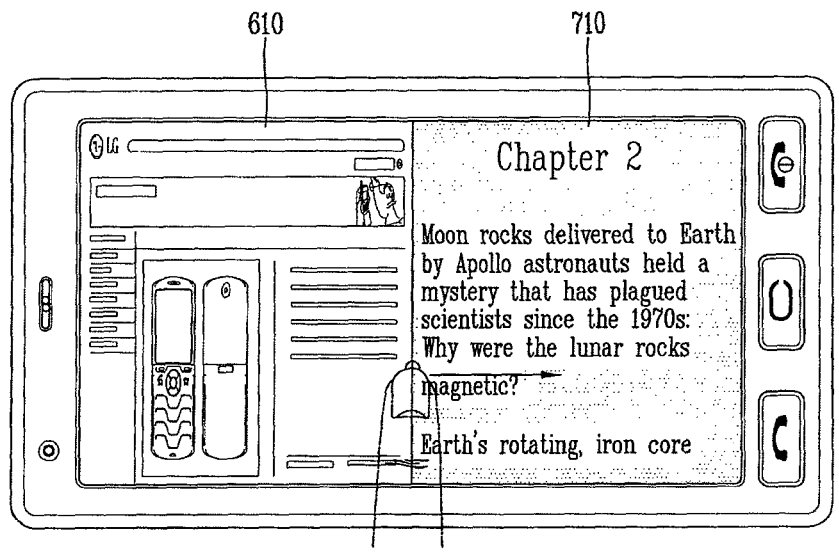
Figure 10B:
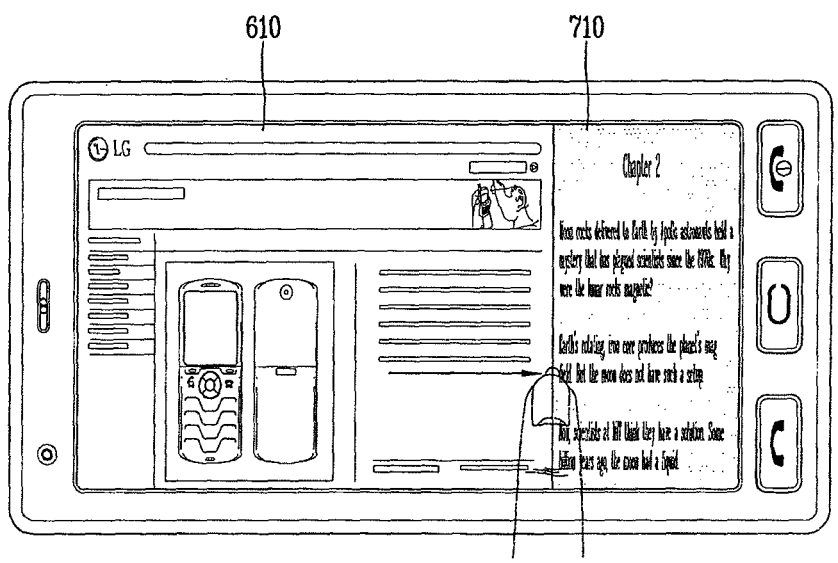
Figure 10C:
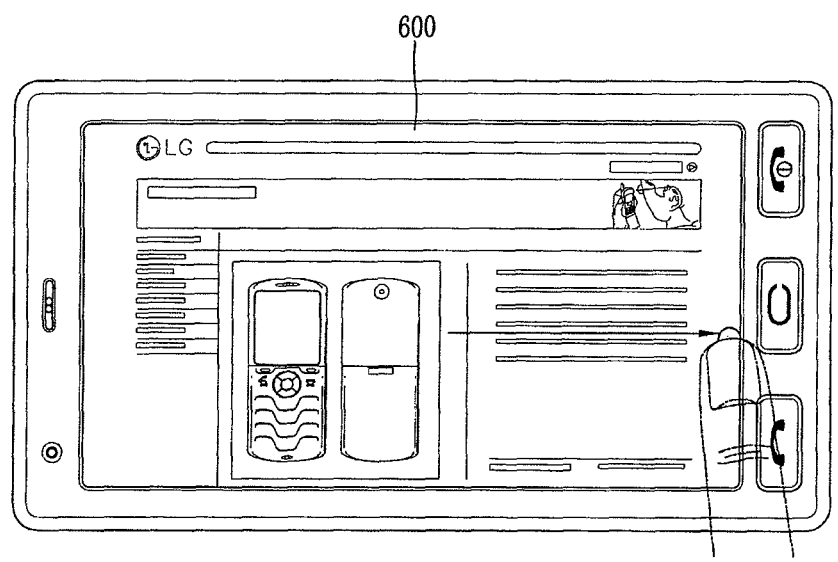

The controller 180 can display a predetermined first screen 600, 610 displayed on the transparent display unit in proportion to a distance generated by a touch-and-drag and a predetermined second screen 710 displayed on the electronic paper to the outside at the same time (see FIGS. 10a, 10b, and 10c).

As illustrated in FIG. 9, the controller 180 controls a transparent display (TOLED) region of the electronic paper 155 overlapped with a predetermined second screen 710 displayed to the outside on the electronic paper 155 to be in a transparent operation mode to maintain a transparent state, thereby allowing the predetermined second screen 710 to be displayed to the outside.

Hereinafter, various application examples according to a second embodiment of the present invention in which multimedia data is displayed on a transparent display unit and text data is displayed on an electronic paper in a mobile communication terminal having a dual display unit will be described.

[First Application Example of the Second Embodiment]

FIG. 11 is a first application example illustrating a method of displaying multimedia data and text data using a dual display unit according to a second embodiment of the present invention.

Figure 11A:
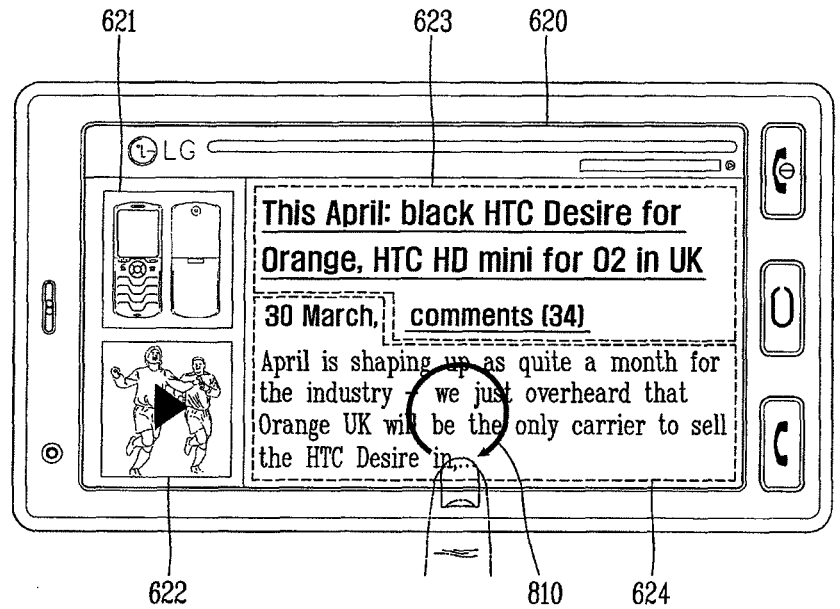
FIGS. 11 and 12 are image views for explaining a method of displaying multimedia data and text data using a dual display unit according to a second embodiment of the present invention.

As illustrated in FIG. 11A, the controller 180 displays a predetermined first screen 620 (here, web screen) by a predetermined application execution command on the transparent display unit 151. The predetermined first screen 620 displayed on the transparent display unit 151 may include an image 621, a video 622 and text data 623, 624. Here, the text data may be divided into a uniform resource locator (URL) for displaying the location of a file in other servers, first text data 623 having another file stored in the storage unit and hyperlink information, and second text data 624 for displaying the content of the relevant document. Also, the text data 623, 624 may be displayed in color.

The user enters a long touch or preset touch gesture 810 to the second text data 624 displayed on the transparent display unit 151 through an input device (here, finger). Here, the touch gesture 810 is displayed in a clockwise circular form but not limited to this, and various types of touch gestures can be set in advance to generate a dual mode driving interrupt signal.

If the controller 180 receives a signal for selecting visual information displayed on the transparent display unit, then an application according to the signal for selecting visual information is set to be primarily implemented in the transparent display unit. On the other hand, if the controller 180 recognizes that a dual mode driving interrupt signal has be generated by a predetermined touch signal (here, long touch) or a preset touch gesture, then an execution application according to the dual mode driving interrupt signal may be controlled to be executed on the transparent display unit and electronic paper.

Figure 11B:
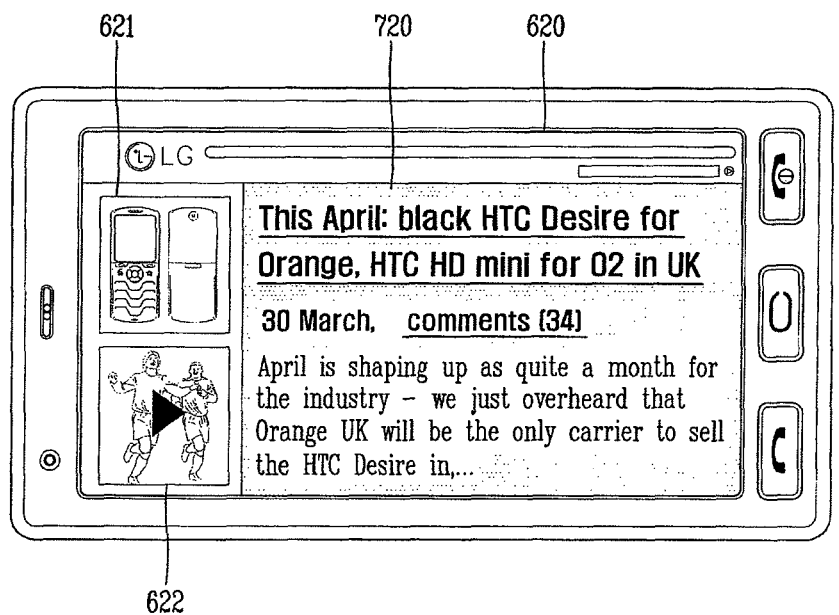

Accordingly, the controller 180 receives a dual mode driving interrupt signal generated by the user's touch gesture 810 to turn on the electronic paper 155 as illustrated in FIG. 11B. At the same time, the controller 180 displays text data 623, 624 (color text data may be excluded) displayed on the predetermined first screen on the electronic paper 155 as a predetermined second screen 720. In this case, the controller 180 controls a region of the transparent display unit 720 overlapped with the predetermined second screen 720 to be operated in a transparent operation mode. In other words, the controller 180 applies electrical signals for displaying multimedia data to a pixel displaying an image 621, a video 622 and the like on the transparent display unit, and controls a pixel displaying text data to be operated in a transparent operation mode.

As a result, multimedia data such as an image 621, a video 622 and the like is displayed on the transparent display unit 151, and text data 623, 624 is displayed on the electronic paper 155, thereby allowing the user to see a screen with a three-dimensional effect derived from the difference between color and black-and-white.

[Second Application Example of the Second Embodiment]

FIG. 12 is a second application example illustrating a method of displaying multimedia data and text data using a dual display unit according to a second embodiment of the present invention.

Figure 12A:
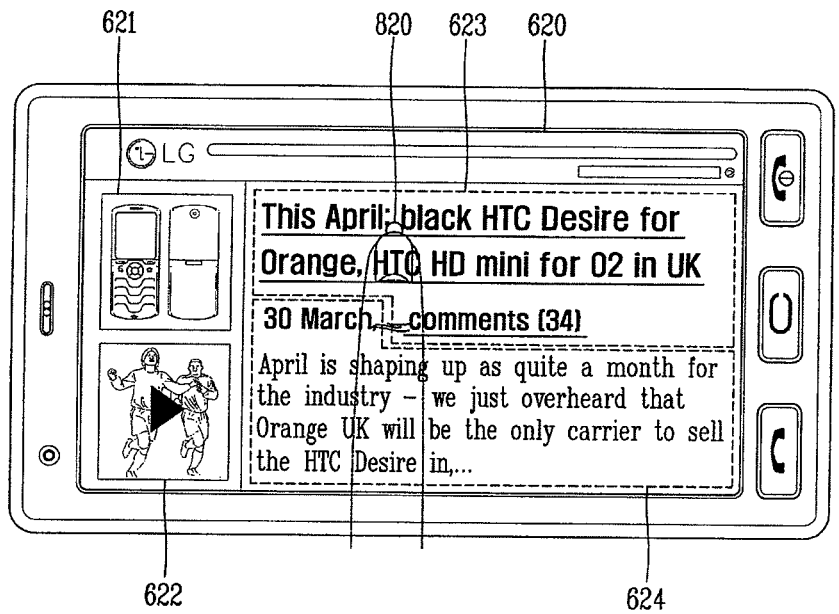

As illustrated in FIG. 12A, the controller 180 displays a predetermined first screen 620 (here, web screen) by a predetermined application execution command on the transparent display unit 151. The predetermined first screen 620 displayed on the transparent display unit 151 may include an image 621, a video 622 and text data 623, 624. Here, the text data may be divided into a uniform resource locator (URL) for displaying the location of a file in other servers, first text data 623 having another file stored in the storage unit and hyperlink information, and second text data 624 for displaying the content of the relevant document. Also, the text data 623, 624 may be displayed in color.

The user enters a long touch 820 or preset touch gesture to the first text data 623 displayed on the transparent display unit 151 through an input device (here, finger). Here, the input for generating the dual mode driving interrupt signal is not limited to a long touch or touch gesture, and may be also performed by a type of preset touch input. Otherwise, a preset hot key may be also used through a user input unit.

Figure 12B:
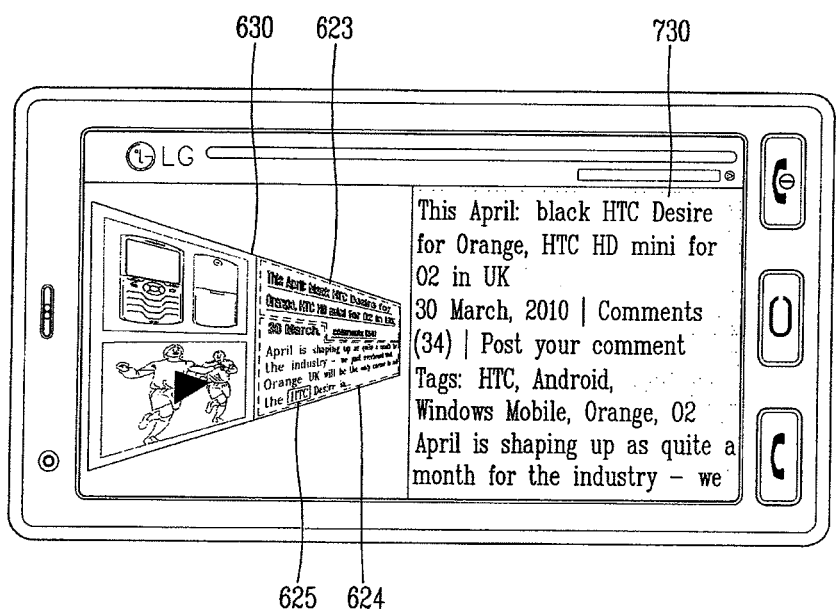

Next, the controller 180 receives a dual mode driving interrupt signal generated by the user's long touch to turn on the electronic paper 155 as illustrated in FIG. 12B. At the same time, the controller 180 displays text data 623, 624 (color text data may be excluded) displayed on the predetermined first screen on the electronic paper 155 as a predetermined second screen 730. In this case, the controller 180 controls a region of the transparent display unit 730 overlapped with the predetermined second screen 730 to be operated in a transparent operation mode.

At the same time, the controller 180 may display the first screen 620 displayed on the transparent display unit as a three-dimensional screen 630 having perspective on a region that is not overlapped with the second screen 730. Here, if a first text data-1 625 having the same data attribute as a first text data is touched by the user on the three-dimensional screen 630, then text data linked to the first text data-1 625 may be displayed on a region displayed with the second screen 730.

The controller 180 controls such that the first screen 620 displayed on the transparent display unit 151 is changed to be displayed as a three-dimensional screen 630 on a certain region of the transparent display unit 151, and text data linked to the first text data or the first text data-1 is displayed on the second screen 730 of the electronic paper 155, thereby allowing the user to conveniently approach the detailed content of an article on the main web page screen without switching the screen. (For example, the controller displays a main web page screen on a transparent display unit, and if a touch signal is entered into a headline article (text data) linked to an URL on the main web page screen, then the controller displays the corresponding detailed content on a second screen of the electronic paper.)

Hereinafter, various application examples according to a third embodiment of the present invention in which a menu execution screen is displayed on a light-emitting display unit based on a predetermined menu selection signal input received on the electronic paper will be described.

According to a third embodiment, an example in which, when recognizing that a dual mode driving interrupt signal has been generated by a predetermined touch signal (here, long touch) or a preset touch gesture, an execution application according to the dual mode driving interrupt signal is implemented on a transparent display unit and an electronic paper will be described with reference to the first and the second embodiment.

[First Application Example of the Third Embodiment]

FIG. 13 is an image of a mobile communication terminal illustrating a first application example according to a third embodiment of the present invention.

Figure 13A:
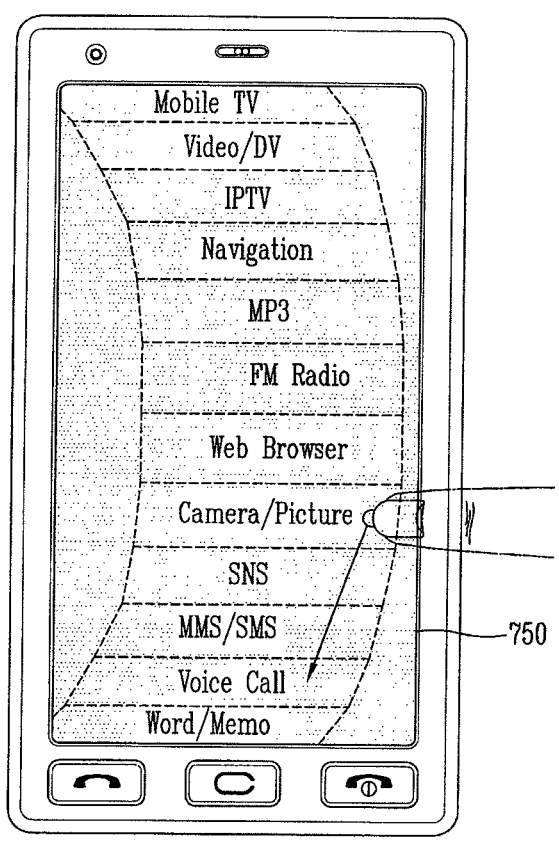
FIGS. 13 through 20 are image views for explaining a method of displaying and changing an execution screen on a transparent display unit according to a predetermined menu selection input entered into an electronic paper according to a third embodiment of the present invention.
Figure 13B:
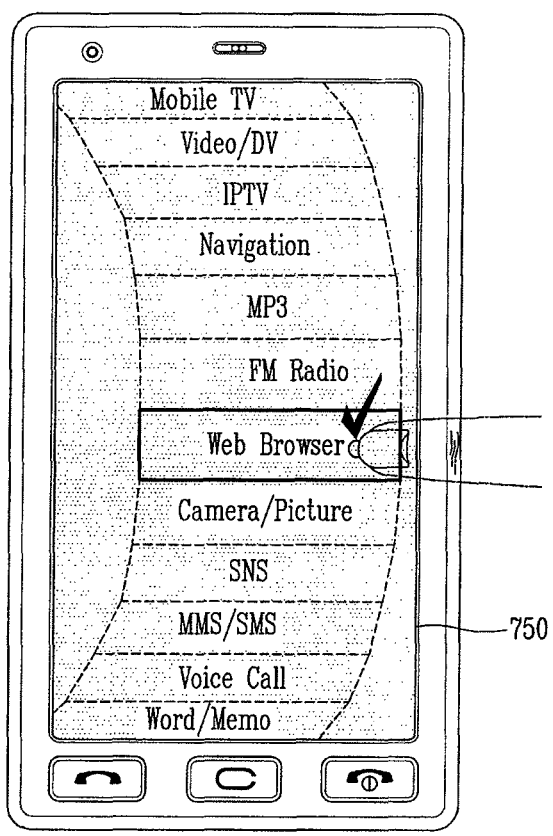

As illustrated in FIG. 13*a*, when power is first applied to a mobile communication terminal through the power supply unit, the controller 180 displays a main screen 750 including predetermined visual information (menu, icon, etc.) on the electronic paper 155. The user may vertically move a menu by flicking on an electronic paper 750 displayed with the menu. Next, the user may implement the relevant application by touching one of the menus (see FIG. 13B).

Figure 13C:
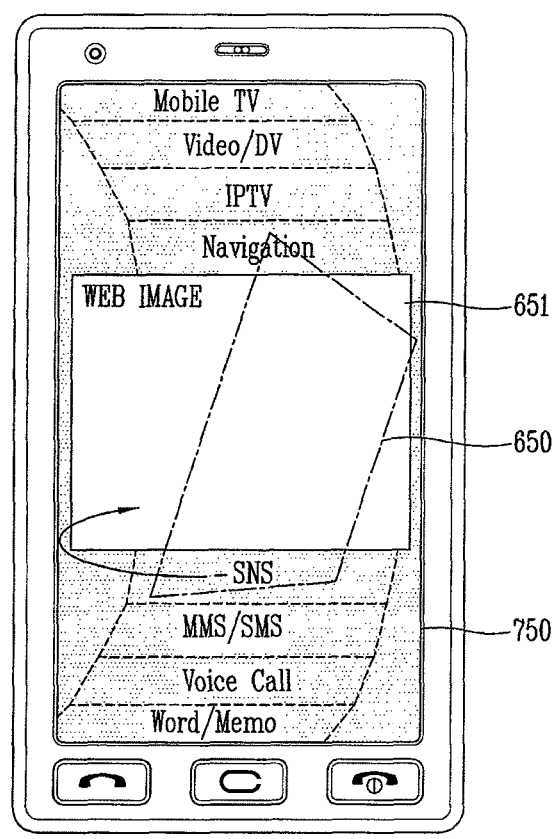

Here, if the controller 180 receives an execution command of the web browser by an input device (finger), then the controller 180 drives the transparent display unit 151, and displays a web image 650 on the transparent display unit 151 while rotating it by 360 degrees (see FIG. 13*c*).

FIG. 14 is an image of a mobile communication terminal illustrating a modified example of the first application example according to a third embodiment of the present invention.

Figure 14A:
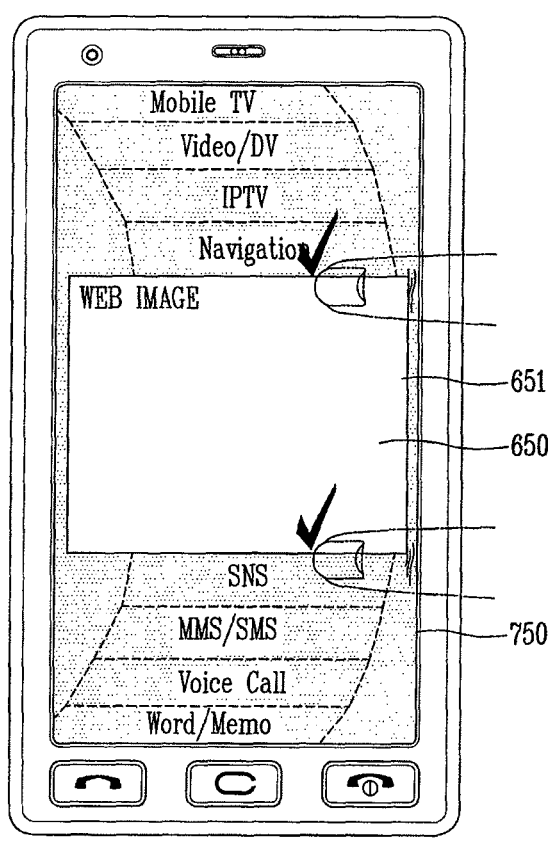

As illustrated in FIG. 14A, a predetermined main screen 750 is displayed on the electronic paper 155, and a web browser application among predetermined menus is implemented on the transparent display unit 151 to display a web image 660.

Figure 14B:
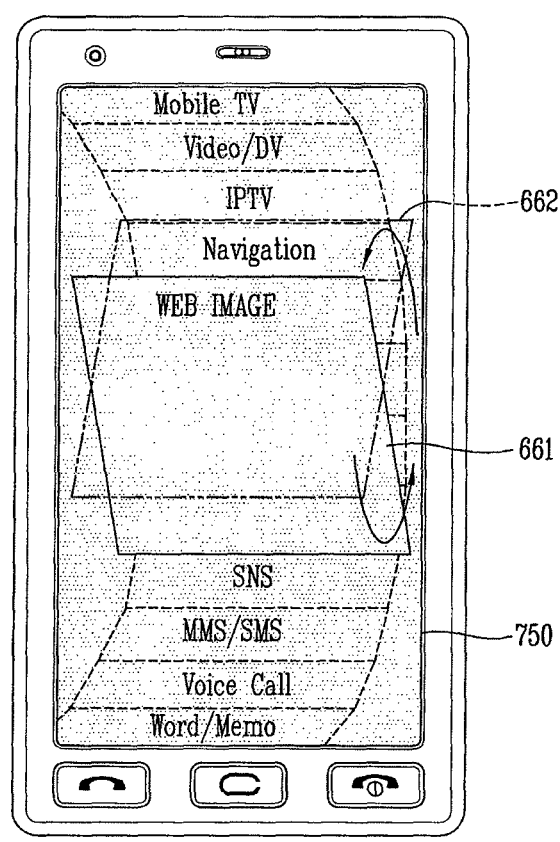

Here, if the controller 180 detects that a series of a first touch signal 832 and a second touch signal 831 have been generated on both edges of the web image 660 through an input device (finger), then web images 661, 662 are displayed on the transparent display unit 151 by rotating the web image 660 by 360 degrees as illustrated in FIG. 14B.

Figure 15A:
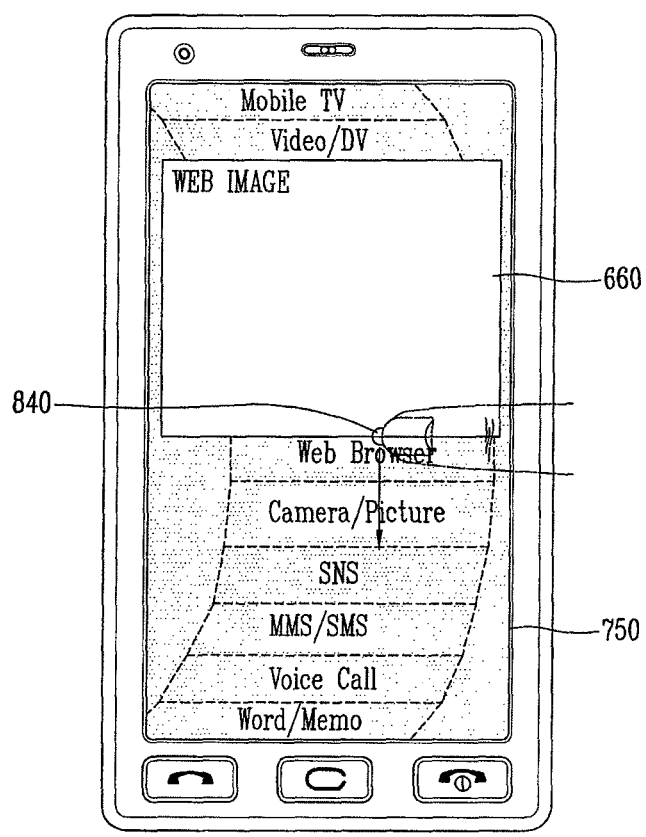
Figure 15B:
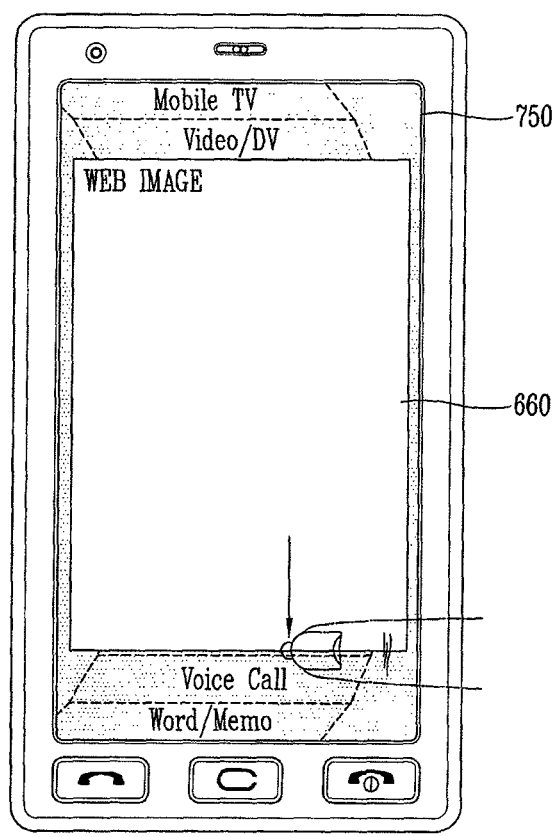

FIG. 15 is an image of a mobile communication terminal illustrating another modified example of the first application example according to a third embodiment of the present invention.

As illustrated in FIG. 15A, a predetermined main screen 750 is displayed on the electronic paper 155, and a web browser application among the predetermined menus is implemented to display a web image 660 on the transparent display unit.

Here, if the controller 180 detects that a touch-and-drag 840 signal has been generated on any one edge of the web image 660 through an input device (finger), then a size of the web image 660 is changed in proportion to a distance generated by the touch-and-drag to be displayed on the transparent display unit 151.

FIG. 16 is an image of a mobile communication terminal illustrating a second application example according to a third embodiment of the present invention.

Figure 16A:
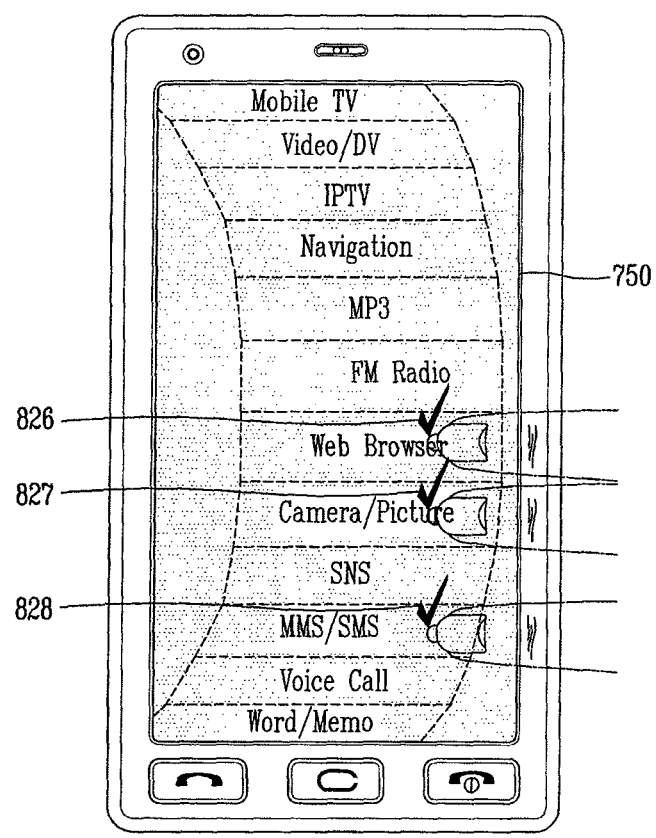
Figure 16B:
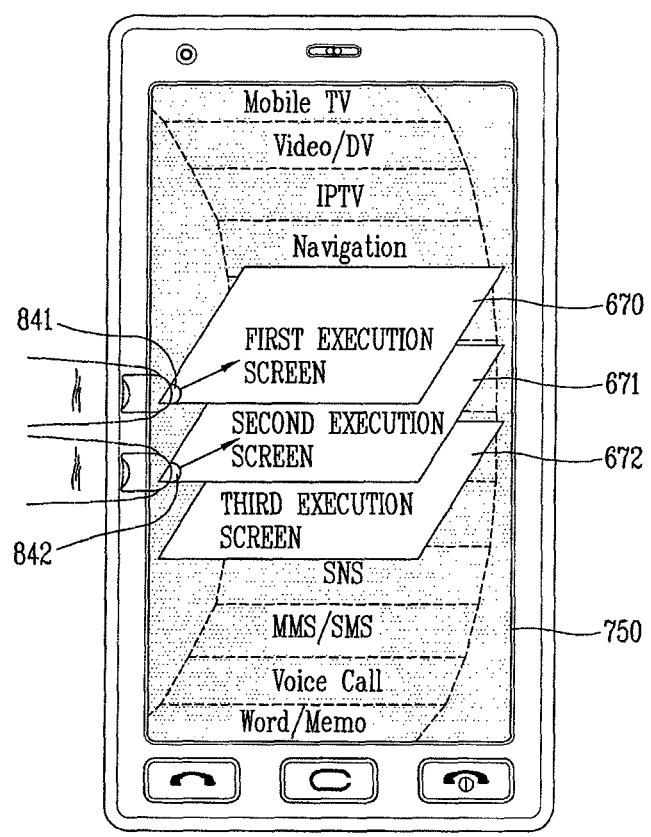

As illustrated in FIG. 16A, when power is first applied to a mobile communication terminal through the power supply unit, the controller 180 displays a main screen 750 including predetermined visual information (menu, icon, etc.) on the electronic paper 155. The user may touch at least any one menu displayed on the main screen 750 through an input device (finger), thereby implementing the selected application on the transparent display unit 151.

Here, if the controller 180 detects that menu selection signals 826, 827, 828 (here, touch signals) have been generated for a web browser menu, a camera/picture menu, and an MMS/SMS menu, respectively, displayed on the electronic paper 155, then a first, a second, and a third execution screen 670, 671, 672 of the selected applications are displayed on the transparent display unit 151.

Figure 16C:
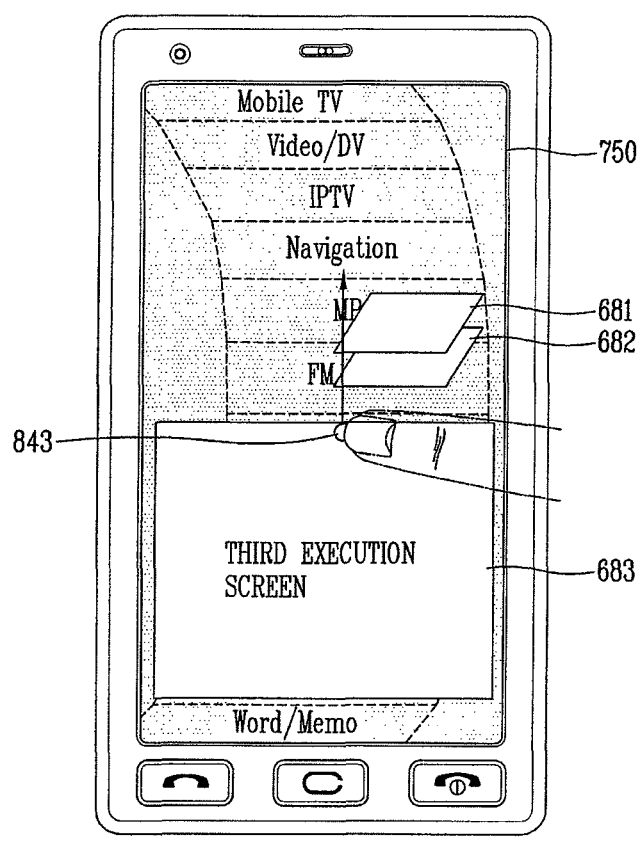
Figure 16D:
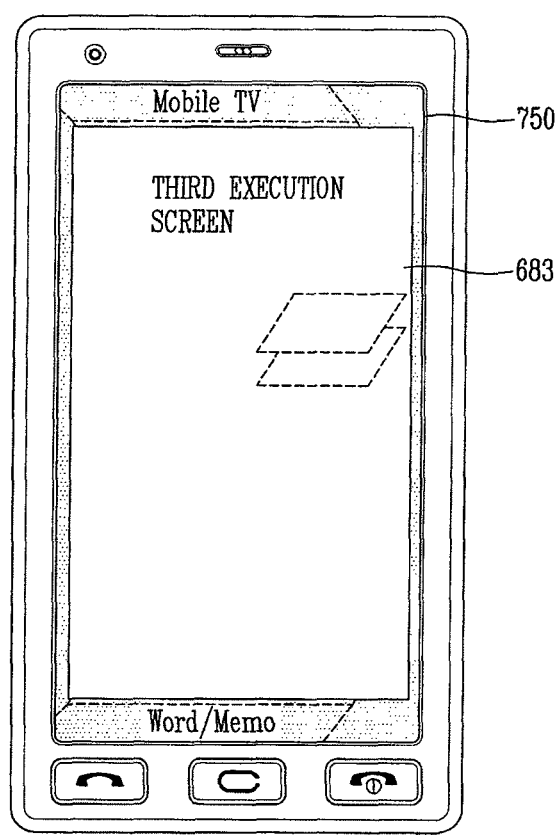

Next, if the controller 180 detects that a touch-and-drag signal 841 has been generated on any one vertex of the first execution screen 670 (see FIG. 16B), then the controller 180 changes the vertical and horizontal lengths of the first execution screen at the same time in proportion to a distance generated by the touch-and-drag, thereby displaying a first execution screen 681 on the transparent display unit 151 (see FIG. 16*c*). Also, if the controller 180 detects that a touch-and-drag 843 signal has been generated on any one edge of the third execution screen 672 (see FIG. 16*c*), then the controller 180 displays a third execution screen 683 changed in size in proportion to a distance generated by the touch-and-drag on the transparent display unit (see FIG. 16*d*).

FIG. 17 is an image of a mobile communication terminal illustrating a third application example according to a third embodiment of the present invention.

Figure 17A:
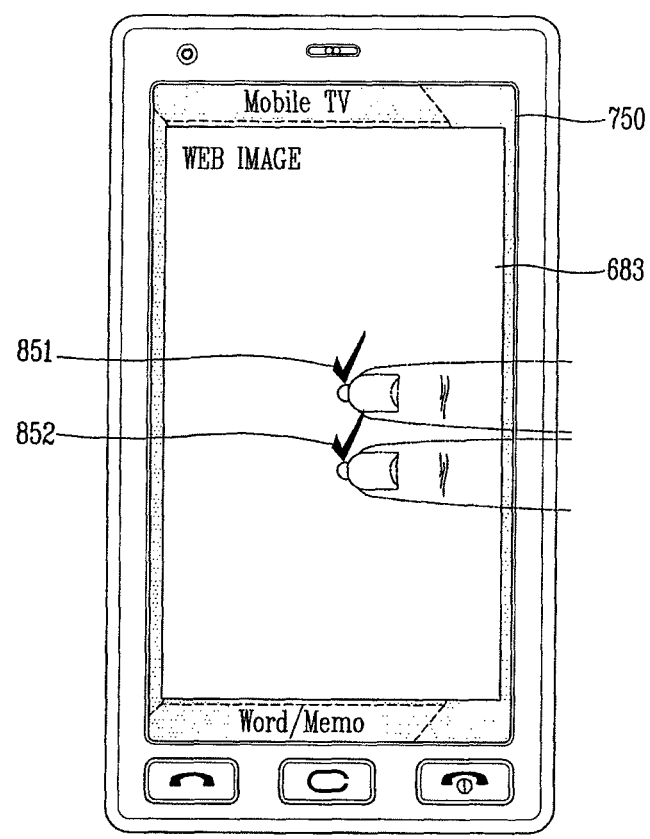

As illustrated in FIG. 17A, a predetermined main screen 750 is displayed on the electronic paper 155, and a web browser application among the predetermined menus is implemented to display a web image 683 on the transparent display unit 151.

Figure 17B:
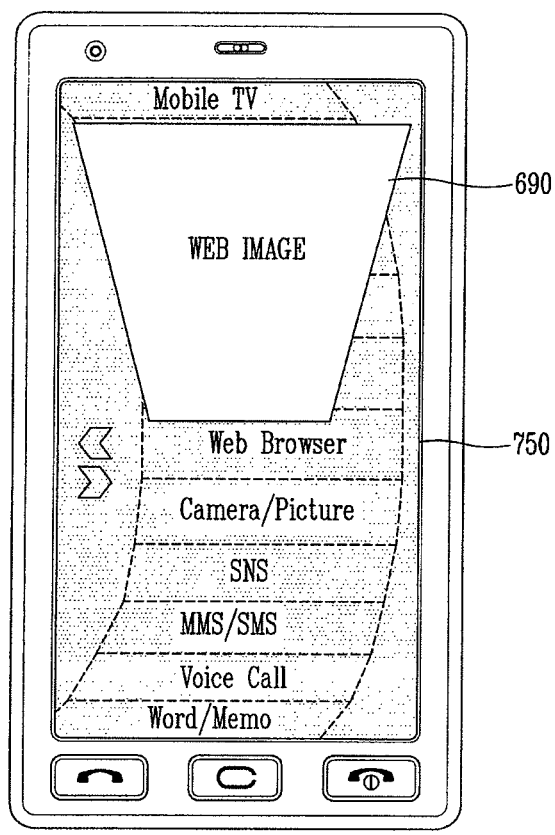

If the controller 180 detects that a series of a third touch signal 851 and a fourth touch signal 852 have been generated on a web image 683 displayed on the transparent display unit 151, then the controller 180 changes the web image 683 to a three-dimensional web image 690 having perspective on a two-dimensional plane to display on the electronic paper transparent display unit 151 as illustrated in FIG. 17*b*.

Figure 17C:
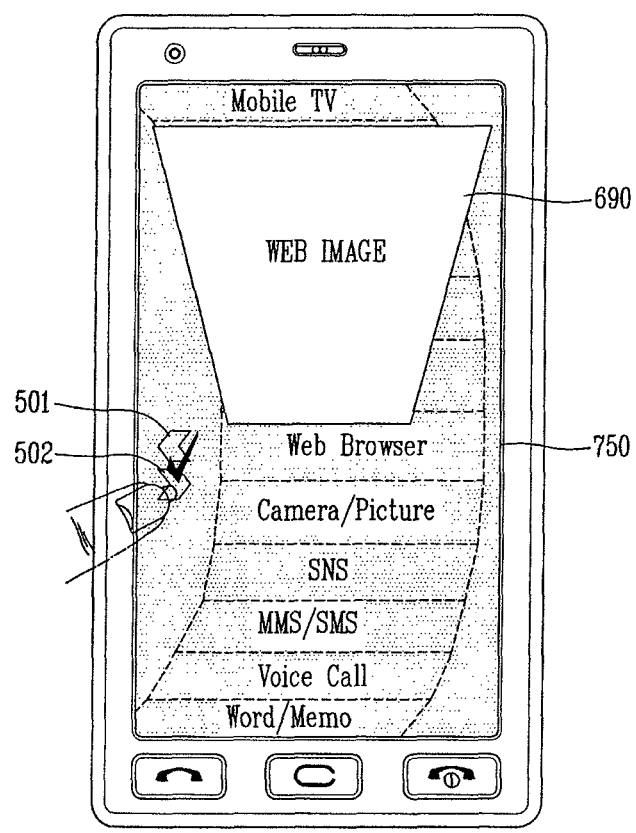
Figure 17D:
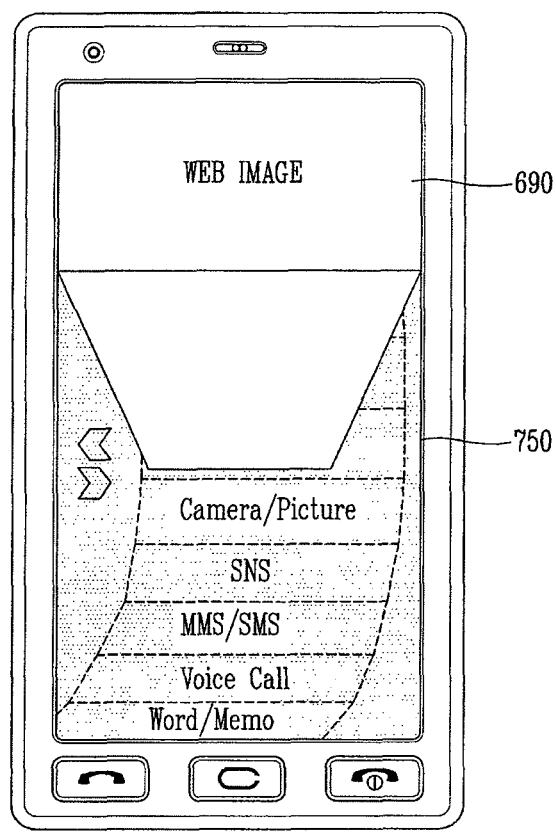

Also, if the controller 180 detects that a zoom-in icon 502 or zoom-out icon 501 displayed on the electronic paper 155 has been entered, then the controller 180 may enlarge or reduce a screen size of the three-dimensional web image 690 to display on the transparent display unit (see FIGS. 17*c* and 17*d*).

FIG. 18 is an image of a mobile communication terminal illustrating a modified example of the third application example according to a third embodiment of the present invention.

Figure 18A:
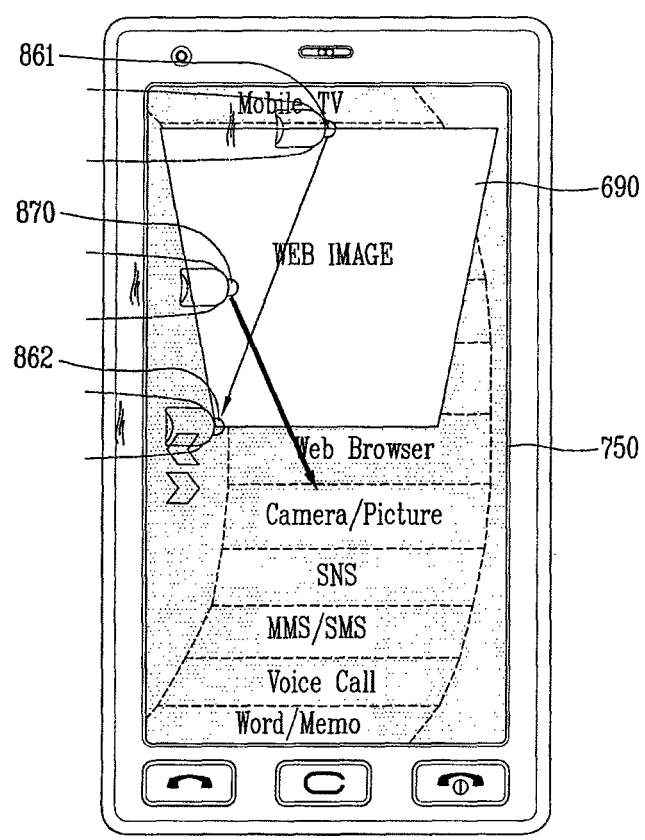
Figure 18B:
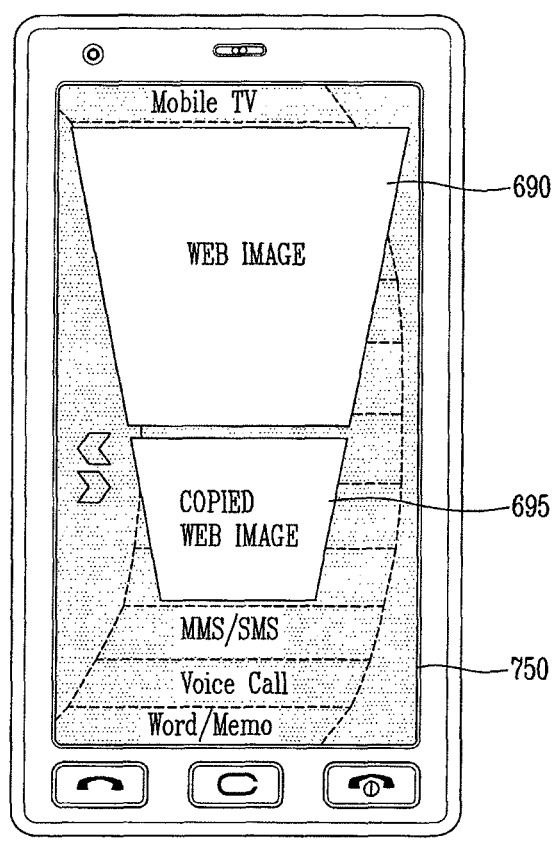

As illustrated in FIG. 18A, a predetermined main screen 750 is displayed on the electronic paper 155, and a web browser application among predetermined menus is implemented on the transparent display unit 151 to display a three-dimensional web image 690.

Here, if the controller 180 detects that a first touch-and-drag signal 861, 862 has been generated from an edge of the three-dimensional web image 690 to any one vertex thereof, then the controller 180 copies the three-dimensional web image. Then, if the controller 180 subsequently detects the generation of a second touch-and-drag signal 870 on the three-dimensional web image 690, then the controller 180 displays a web image 695 that has copied the three-dimensional web image 690 at a region moved in proportion to a distance generated by the second touch-and-drag on the transparent display unit 151 (see FIG. 18B). In other words, the user may enter a predetermined first touch signal on an application execution screen to be copied to designate a copy selection region, and then subsequently enters a predetermined second touch signal to move the execution screen that has been copied at a region to be moved on the transparent display unit.

FIG. 19 is an image of a mobile communication terminal illustrating another modified example of the third application example according to a third embodiment of the present invention.

Figure 19A:
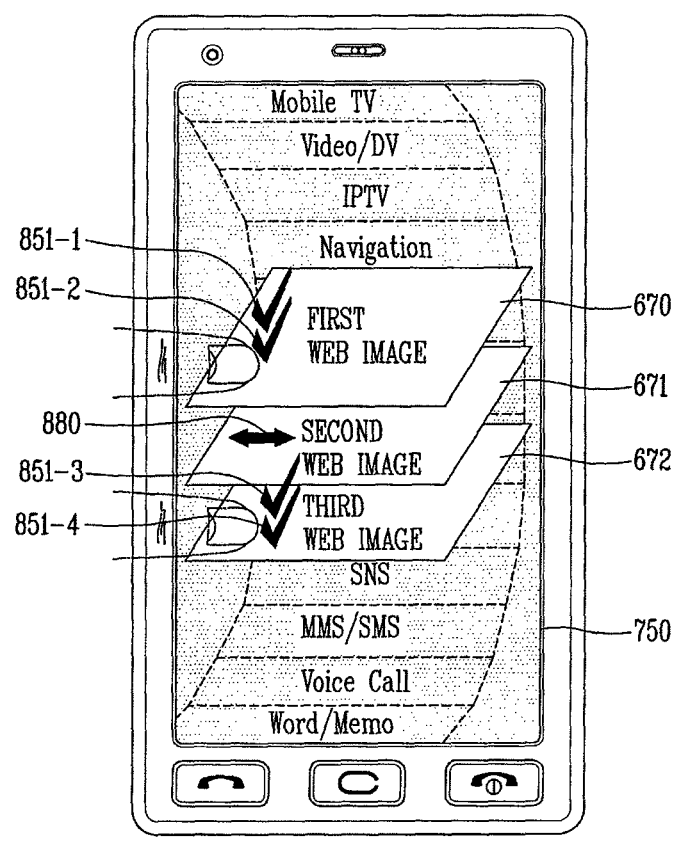

As illustrated in FIG. 19A, when power is first applied to a mobile communication terminal through the power supply unit, the controller 180 displays a main screen 750 including predetermined visual information (menu, icon, etc.) on the electronic paper 155. The user may touch at least any one menu displayed on the main screen 750 through an input device (finger), thereby implementing the selected application on the transparent display unit 151.

Figure 19B:
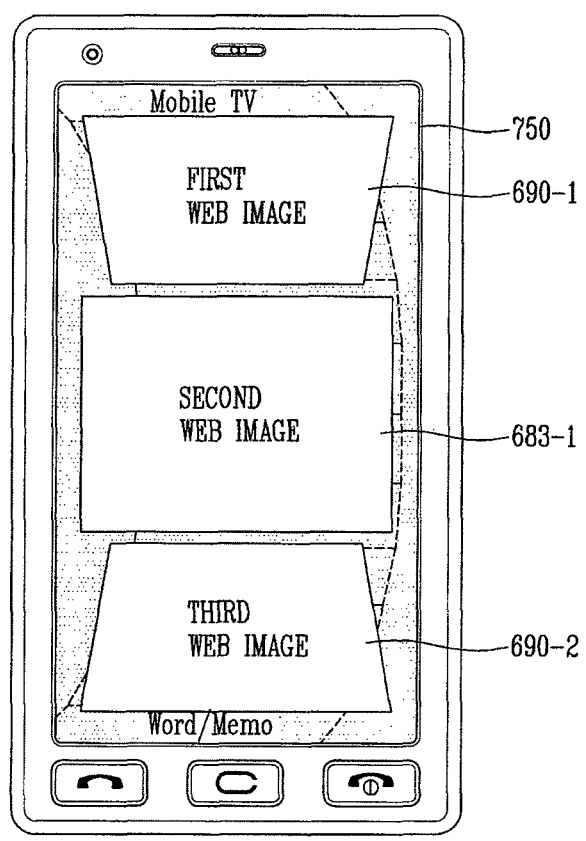

Here, a first web image 670, a second web image 671, and a third web image 672 are displayed on the transparent display unit 151. The controller 180 detects that a series of a fifth touch signal-1 851-1 and a fifth touch signal-2 851-2 on the first web image 670, a bidirectional drag signal 880 on the second web image 671, and a series of a sixth touch signal-1 851-3 and a sixth touch signal-2 851-4 on the third web image 672 have been sequentially generated. In this case, as illustrated in FIG. 19B, the controller may change the first web image 670 and third web image 672 that have received a series of touch signals to display three-dimensional web images 690-1, 690-2 having perspective, respectively, and at the same time, change the second web image 671 that has received a bidirectional drag signal to display a two-dimensional web image 683-1 at a region of the transparent display unit that is not overlapped with the three-dimensional web images 690-1, 690-2.

FIG. 20 is an image of a mobile communication terminal illustrating still another modified example of the third application example according to a third embodiment of the present invention.

Figure 20A:
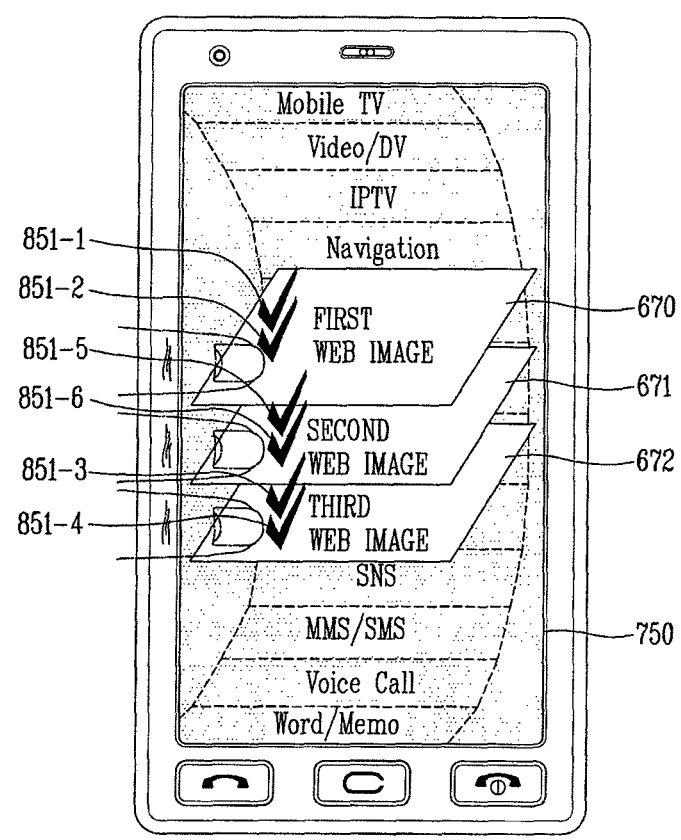

As illustrated in FIG. 20a, when power is first applied to a mobile communication terminal through the power supply unit, the controller 180 displays a main screen 750 including predetermined visual information (menu, icon, etc.) on the electronic paper 155. The user may touch at least any one menu displayed on the main screen 750 through an input device (finger), thereby implementing the selected application on the transparent display unit 151.

Figure 20B:
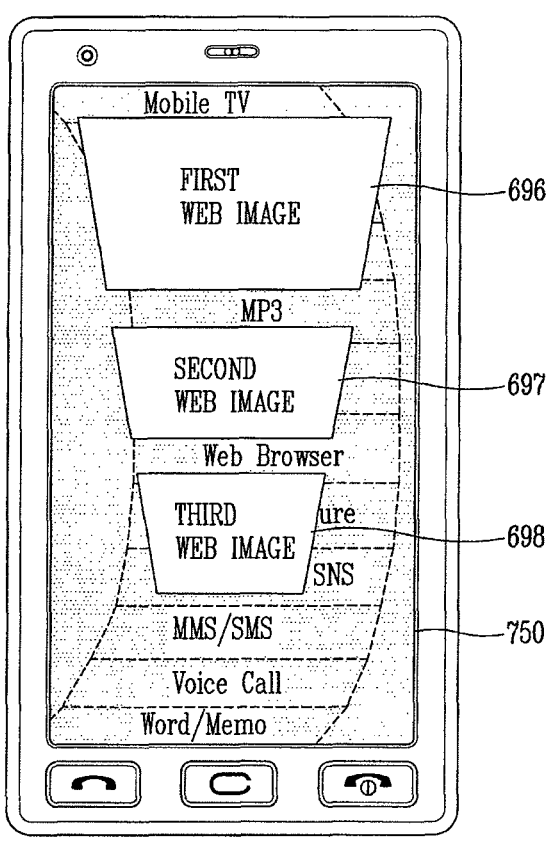

Here, a first web image 670, a second web image 671, and a third web image 672 are displayed on the transparent display unit 151. The controller 180 detects that a series of a fifth touch signal-1 851-1 and a fifth touch signal-2 851-2 on the first web image 670, a series of a seventh touch signal-1 851-5 and a seventh touch signal-2 851-6 on the second web image 671, and a series of a sixth touch signal-1 851-3 and a sixth touch signal-2 851-4 on the third web image 672 have been sequentially generated. In this case, as illustrated in FIG. 20b, the controller may change the first web image 670, second web image 671, third web image 672 that have received a series of touch signals to display three-dimensional web images 696, 697, 698 having perspective, respectively, on the transparent display unit 151.

As a result, according to a third embodiment of the present invention, the user may select at least one or more menus displayed on the electronic paper to implement the selected application on the transparent display unit, and change the execution screen to the user's desired size or shape, thereby conveniently performing a multitasking operation.

Display Structure Overlapped with a Transparent Display Unit and a Non-transparent Display Unit Next, a mobile communication terminal having the display structure that is overlapped with a transparent display unit and a non-transparent display unit according to another embodiment of the present invention and a control method thereof will be described below.

Figure 21:
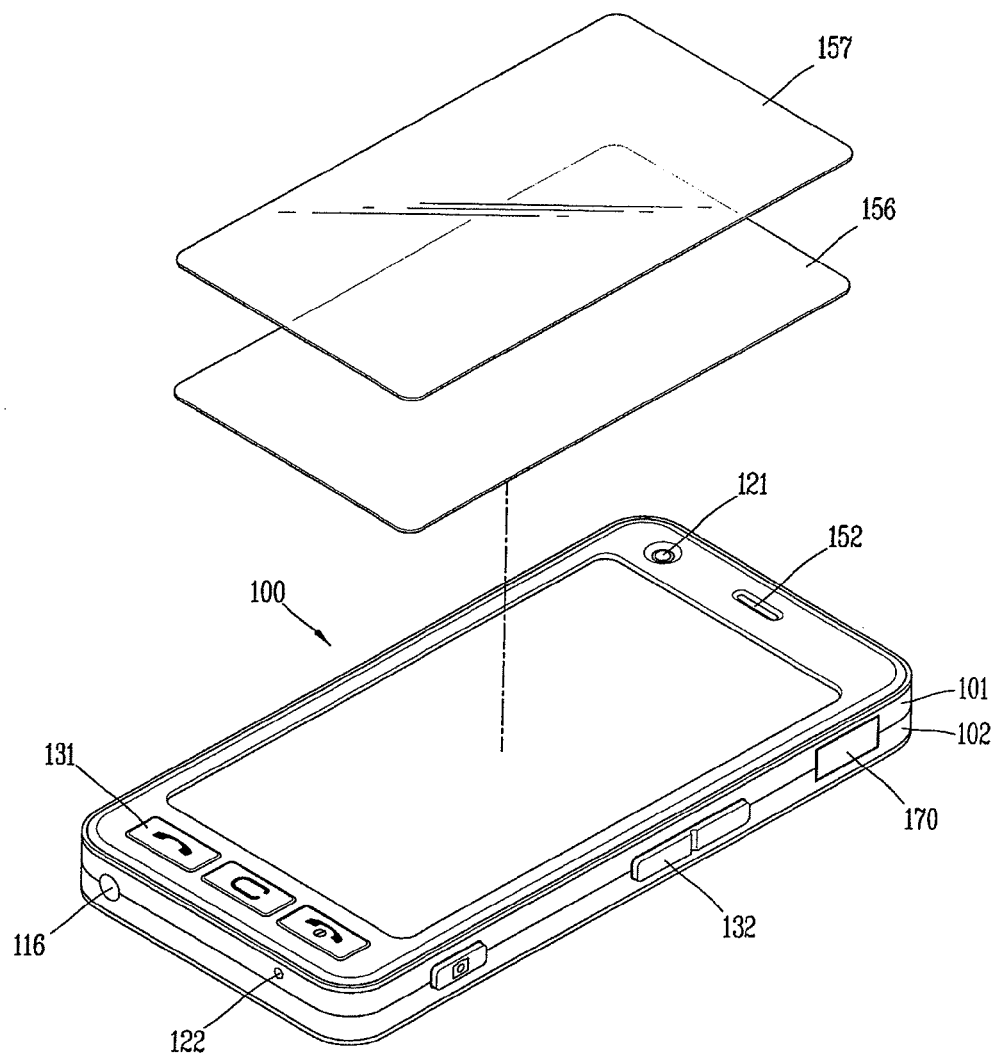
FIG. 21 is a cross-sectional view illustrating a display having a double coupling structure associated with the present invention.

FIG. 21 is a conceptual view illustrating the structure of a display unit in a mobile terminal associated with the present invention.

In this embodiment, a display unit 151 or display module 151 has a form that is overlapped with a first and a second display units 156 and 157. The first and the second display units 156 and 157 may include a transparent display (for example, transparent OLED (TOLED)) and a non-transparent display (for example, LCD, e-paper, etc). In particular, the electronic paper has a low power consumption, thereby obtaining an effect that a watch is always turned on without entering into a sleep mode when applied to a watch phone.

Furthermore, the transparent display and non-transparent display may be configured in an overlapped manner or may be configured in a separate manner. For example, a single display is configured with one module by overlapping a transparent display with a non-transparent display, but a dual display is configured by dividing a transparent display and a non-transparent display into separate display modules.

Hereinafter, in all embodiments, the transparent display (or second display) may be referred to as a transparent OLED (TOLED), and the non-transparent display (or first display) may be referred to as a liquid crystal display (LCD) or electronic paper (e-paper). However, it is not to limit the transparent display and non-transparent display to only TOLED and LCD (or e-paper), respectively.

Furthermore, if the transparent display (TOLED) is operated in a single in a mobile terminal associated with the present invention, then the driving of an LCD may be blocked not to obstruct displaying the TOLED. Also, the transparency of a second display may be controlled not to obstruct displaying the non-transparent display (LCD or e-paper). The transparency may be controlled from 0%, a completely transparent state, to 100%, a non-transparent state.

In addition, a touch pad (not shown) may be overlapped with either one of the upper and lower side surfaces of the TOLED and LCD (or e-paper) to be used as a touch screen. Hereinafter, unless otherwise noted, it is assumed that the TOLED and LCD (or e-paper) are operated as a touch screen in all embodiments of the present invention.

Hereinafter, a method of controlling the operation of a mobile terminal provided with a display having the foregoing overlapped structure will be described.

FIG. 22 is an exemplary view for explaining an object selection method based on a location where an object is displayed in a mobile terminal having an overlapped display structure according to the present invention.

Figure 22A:
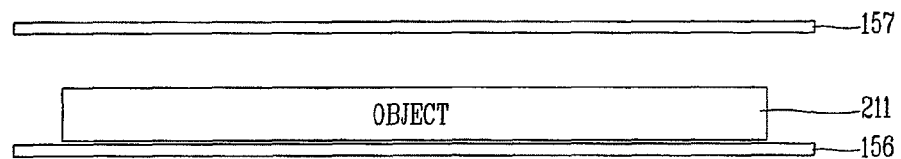
FIG. 22 is an exemplary view for explaining an object selection method based on a location where an object is displayed in a mobile terminal having an overlapped display structure according to the present invention.
Figure 22B:
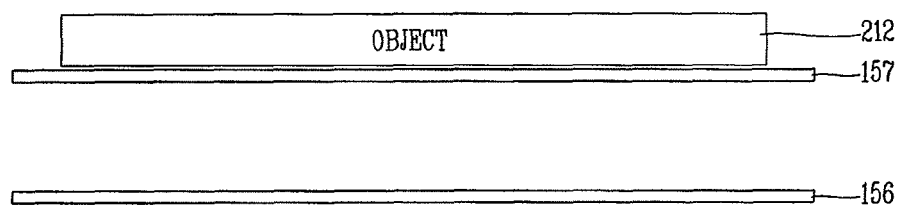
Figure 22C:
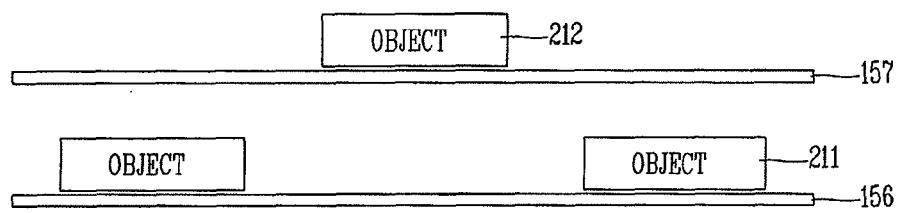

If a first display and a second display are overlapped with each other, an object 211 may be displayed only on the first display as illustrated in FIG. 22A, or an object 212 may be displayed only on the second display as illustrated in FIG. 22B. Otherwise, objects 211, 212 may be separately displayed on the first and the second display but those objects may be displayed not to be overlapped with each other.

Here, an object denotes information displayed associated with the operation of a mobile terminal, such as a menu icon, a text menu list, or a scroll bar.

If an object is displayed only on either one side display even though the displays are overlapped with each other, or the display location of objects are not overlapped with each other even though the objects are displayed on both side displays 156, 157, then the controller 180 can implement a menu associated with the touched object, regardless of on which display the object is displayed, when the user touches the second display which is an upper display.

Figure 22D:
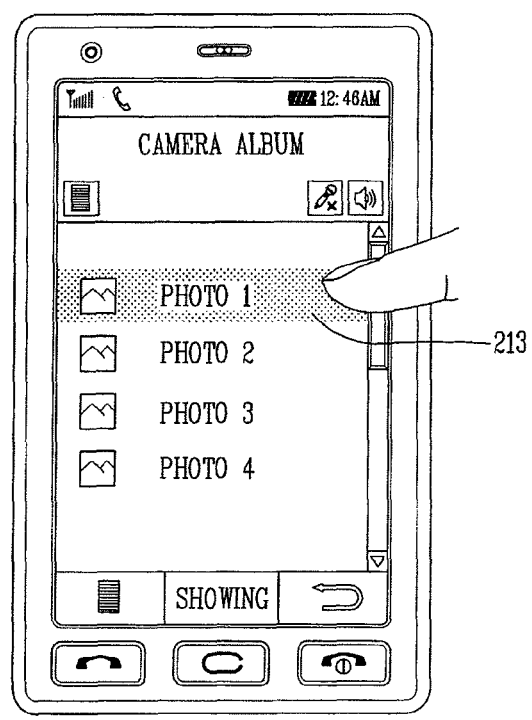

For reference, an highlight effect may be applicable thereto by displaying a specific object on an upper display (for example, second display) when displaying a menu list (or information list) as illustrated in FIG. 22D. The user may touch an object to which the highlight effect is applied or touch an object to which the highlight effect is not applied.

To this, if the touched object is a controllable object (for example, activated object) regardless of whether or not it is highlighted, the controller 180 may implement a menu or operation associated with the object. However, if the touched object is a uncontrollable object (for example, inactivated object), then the controller 180 does not perform any operation. The activated or inactivated state may be displayed in a separate manner regardless of its highlight effect.

As described above, there has been described a method of selecting a specific object when there is no object displayed in an overlapped manner even though the displays are overlapped with each other. Hereinafter, a method of selecting a specific object when objects different from each other are displayed on displays overlapped with each other, respectively, will be described.

Figure 23A:
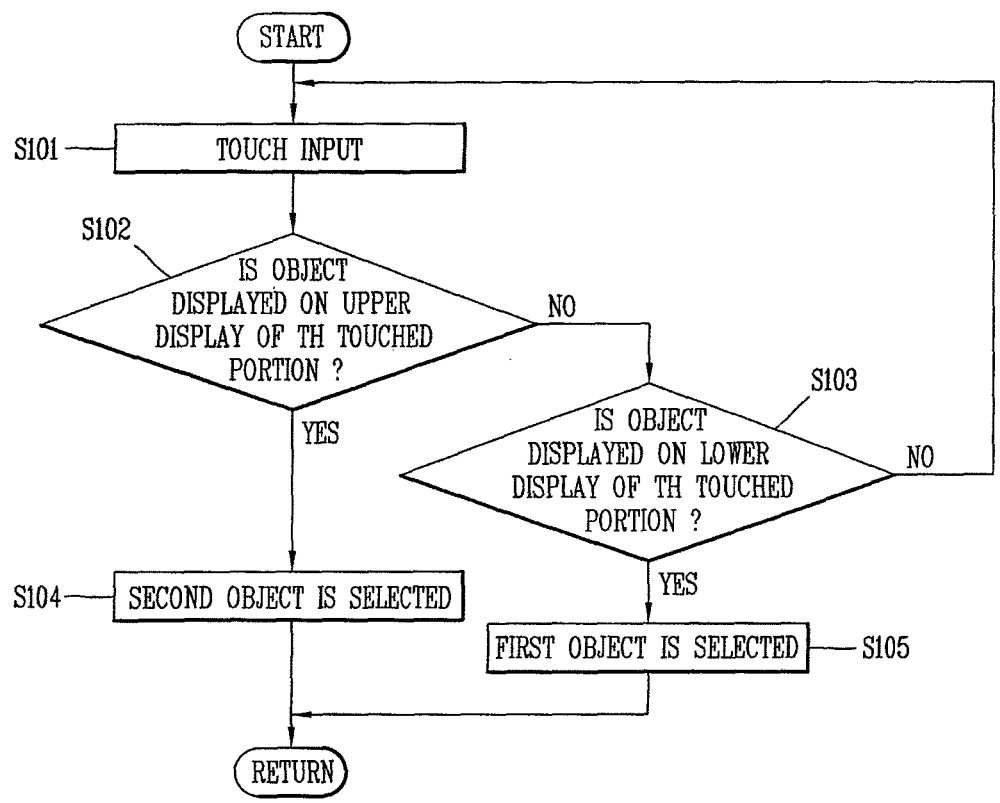
FIGS. 23A and 23B are exemplary views for explaining an object selection method in case of displaying an object in an overlapped manner in a mobile terminal having an overlapped display structure according to the present invention.
Figure 23B:
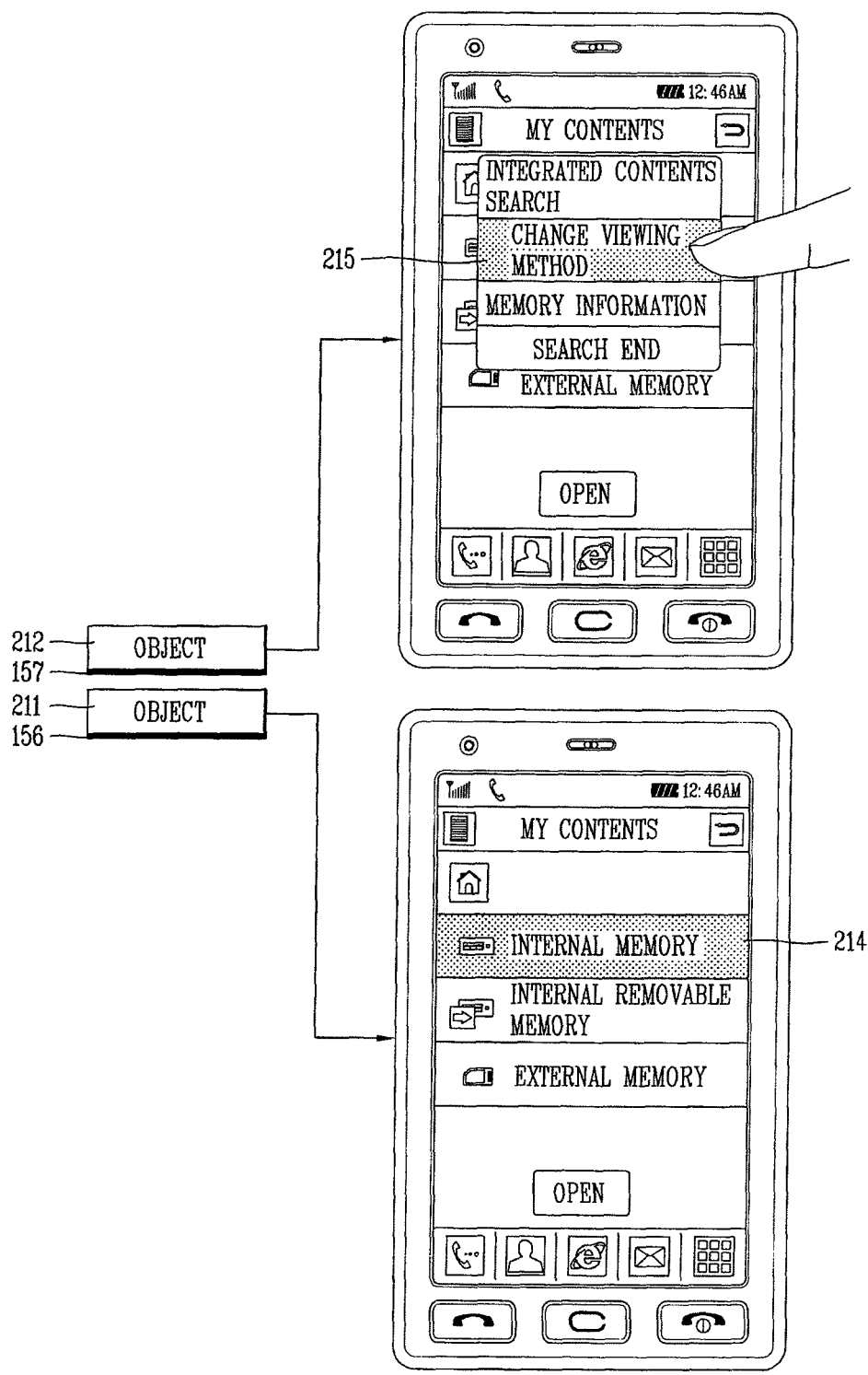

FIGS. 23A and 23b are exemplary views for explaining an object selection method in case of displaying an object in an overlapped manner in a mobile terminal having an overlapped display structure according to the present invention.

As illustrated in the drawings, when a first display and a second display are overlapped with each other, objects may be also displayed in an overlapped manner on the first and the second display. A first object displayed on the first display and a second object displayed on the second display denotes different information.

Here, the second object displayed on the second display which is an upper display may be displayed such that the whole or part of the second object is overlapped with the first object according to its size. If the user's touch is entered on a portion where objects are displayed in an overlapped manner as described above (S101), then the controller 180 determines whether or not an object is displayed on an upper display (=second display) of the touched portion (S102). Accordingly, if an object (=second object) is displayed on the upper display, then it may be determined that the object (second object) has been selected (S104). However, if an object (=second object) is not displayed on an upper display of the touched portion but an object (=first object) is displayed on a lower display thereof (an example of S103), then it may be determined that the first object has been selected (S104).

However, when the user's touch is entered on a portion where the objects (first object and second object) are not displayed in an overlapped manner, it will follow the foregoing method.

For example, in a state of assuming that a first object displayed on the first display 156 is a main menu list and a second object displayed on the second display 157 is a sub-menu list, if the user selects a specific menu item (for example, internal memory item) 214 from the main menu list displayed on the first display, then the controller 180 may display its sub-menu list 215 on the second display.

To this, the user may select and implement his or her desired sub-menu item from the sub-menu list 215 displayed on the second display. Here, if a first object displayed on the first display is located at a position of not being overlapped with a second object displayed on the second display, then the user may touch the second display to immediately select the first object.

On the other hand, an object displayed on the first display or the second display may be selected by using another input unit (for example, a button, a proximity touch, a jog wheel, a trackball, a joystick, etc.) provided in a mobile terminal. At this time, if a specific object is selected by using the another input unit, then either one of the first display 156 and the second display 157 may be selected to select an object displayed thereon.

In the foregoing embodiment, there has been described a method of first selecting an object displayed on the second display, which is an upper display, if a first object is displayed on the first display and a second object is displayed on the second display in an overlapped manner, and selecting a first object that is not overlapped therewith to select a first object displayed in the first display, which is a lower display, or selecting either one of the first display and the second display using another user interface unit to select an object displayed thereon.

Hereinafter, a method of selecting either one of a first object and a second object according to touch pressure when the first object displayed on the first display and the second object displayed on the second display are overlapped with each other will be described.

Figure 24:
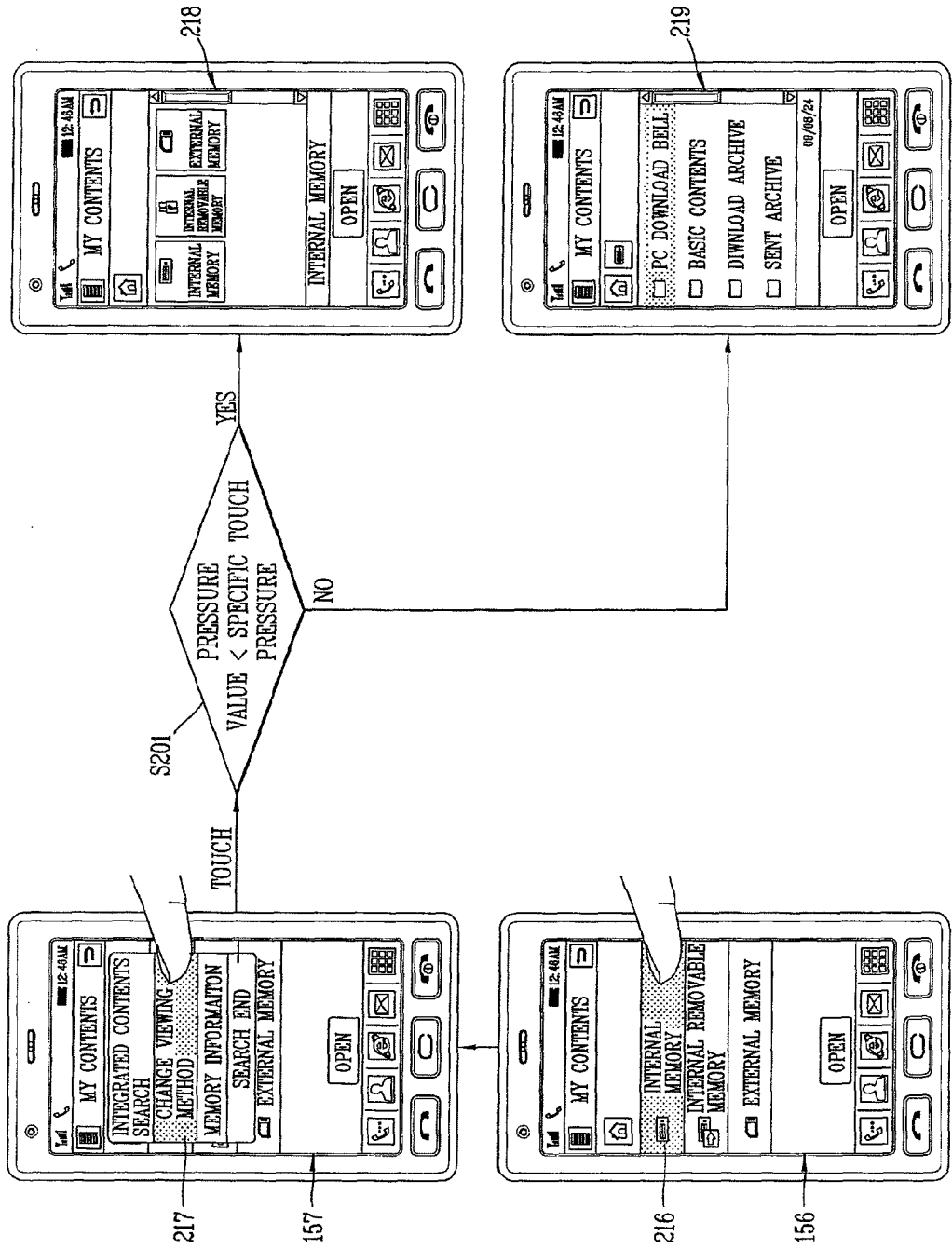
FIG. 24 is another exemplary view for explaining an object selection method using pressure in a mobile terminal having an overlapped display structure according to the present invention.

FIG. 24 is another exemplary view for explaining an object selection method using pressure in a mobile terminal having an overlapped display structure according to the present invention.

As illustrated in the drawing, if a first object displayed on the first display and a second object displayed on the second display are displayed in an overlapped manner, then the user may select either one of the object displayed on the first display and the object displayed the second display using a touch pressure.

For example, it is assumed that a main menu list, which is a first object, is displayed on the first display 156 and a sub-menu list, which is a second object, is displayed on the second display 157. Also, it is assumed that the user selects a specific menu list (for example, internal memory item) 216 from a main menu list displayed on the first display to display the sub-menu list on the second display.

To this, if the user touches his or her desired sub-menu item 217 from the sub-menu list displayed on the second display using a pressure having a value less than a preset specific touch pressure (an example of S201), then the controller 180 can select and implement the sub-menu item (218). However, if the touch pressure is performed with a value greater than a preset pressure, then a main menu item 216 corresponding to the touch position is touch-inputted from the main menu list displayed on the first display to be overlapped with the sub-menu list, and accordingly, the controller 180 can select and implement the main menu item 216 (219).

In order to select an object displayed on the upper display or an object displayed on the lower display according to touch pressure inputted by the user as described above, a mobile terminal may be provided with a pressure detection sensor (not shown) in the sensing unit 140.

According to another embodiment, if a first object displayed on the first display and a second object displayed on the second display are displayed in an overlapped manner, then the user may select one of the first object displayed on the first display and the second object displayed on the second display. For example, if the user touches his or her desired sub-menu item for a time less than a specific preset time (for example, short touch) from a sub-menu list displayed on the second display, then the controller 180 may select and implement the sub-menu item. However, if the user touches his or her desired main menu item for a time greater than a specific preset time (for example, short touch) from a main menu list displayed on the first display to be overlapped with the sub-menu list, then the controller 180 may select and implement the main menu item.

Figure 25:
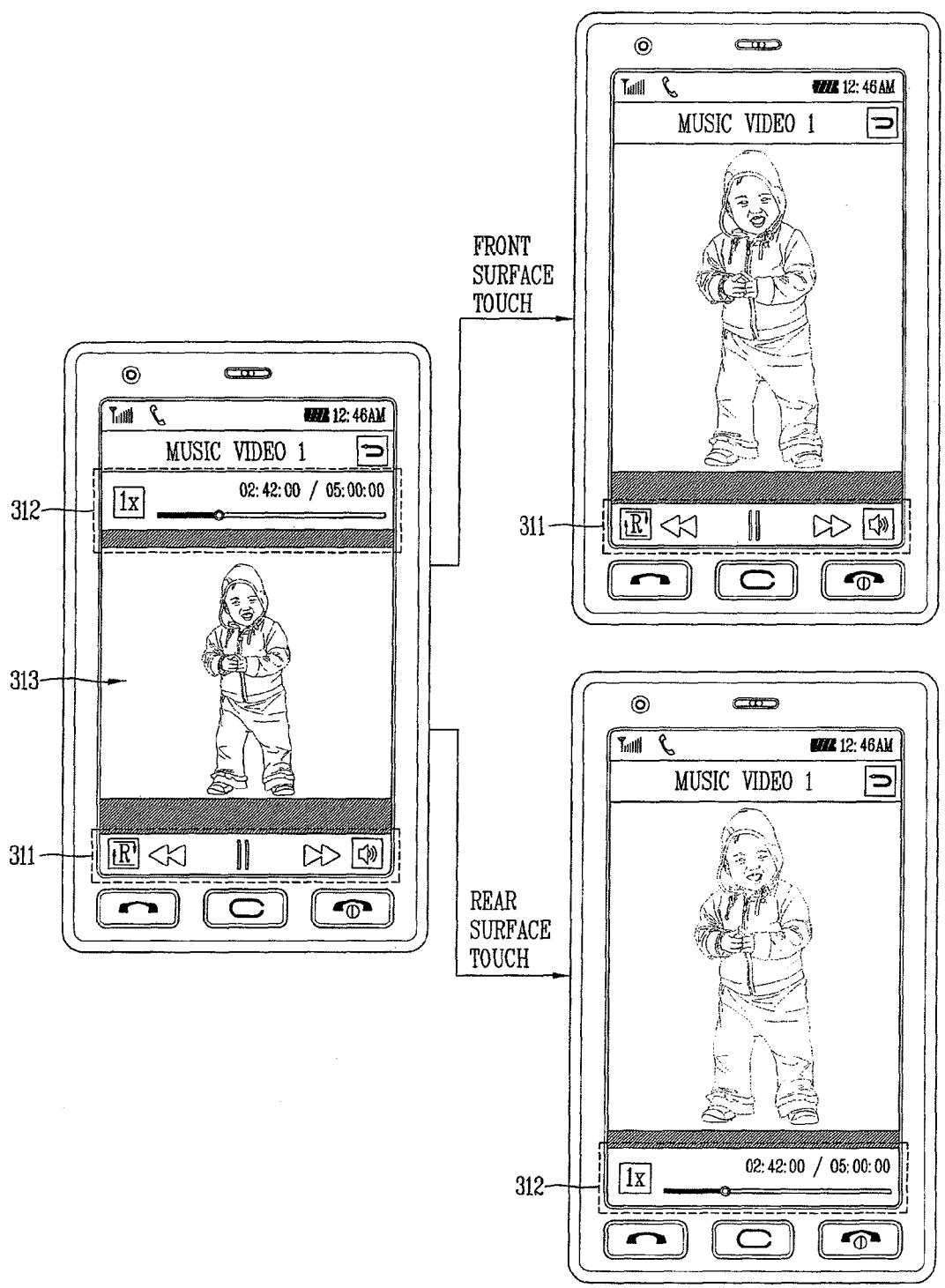
FIG. 25 is an exemplary view for explaining an object selection method using a rear-surface touch in a mobile terminal having an overlapped display structure according to the present invention.

FIG. 25 is an exemplary view for explaining an object selection method using a rear-surface touch in a mobile terminal having an overlapped display structure according to the present invention.

As illustrated in the drawing, according to this embodiment, a touch pad is provided at a front surface (for example, an upper side surface of the second display which is an upper display) of the mobile terminal, and a touch pad is also provided at a back or rear surface (for example, a lower side surface of the first display which is a lower display or a lower side surface of the body) of the mobile terminal, and then it is allowed to select a first object displayed on the first display or a second object displayed on the second display according to a touch input surface (for example, front surface, rear surface).

For example, assuming that a MP3 music or video is reproduced in a mobile terminal, a plurality of control buttons 311, 312 may be displayed on the screen. A region 313 for displaying specific information (for example, video) is decreased as increasing the number of displayed control buttons. As a result, in a mobile terminal having an overlapped display structure as in the present invention, the control buttons 311, 312 are divided into a first display 156 and a second display 157 and displayed in an overlapped manner, thereby relatively increasing a region displaying the specific information (for example, video).

If a specific control button (for example, first object) on the first display and another specific control button (for example, second object) on the second display are displayed to be overlapped on the same position, then the user may touch a rear surface (or back surface) of the mobile terminal to select a first object 312, and touch a front surface to select a second object 311. Also, if the user touches the rear surface, then the controller 180 outputs a pointer (not shown) for showing a position corresponding to the touch on the first display, and then moves the pointer according to the user's touch or drag. Also, if the user touch the rear surface, then the controller 180 may increase the transparency of the second display to highlight control buttons (=first objects) displayed on the first display, thereby allowing the user to view more clearly.

To this, the user may select an activated object among the first objects using the pointer. Furthermore, if the user touches the front surface, then a second object displayed on the second display may be immediately selected even though the pointer is not shown.

Figure 26:
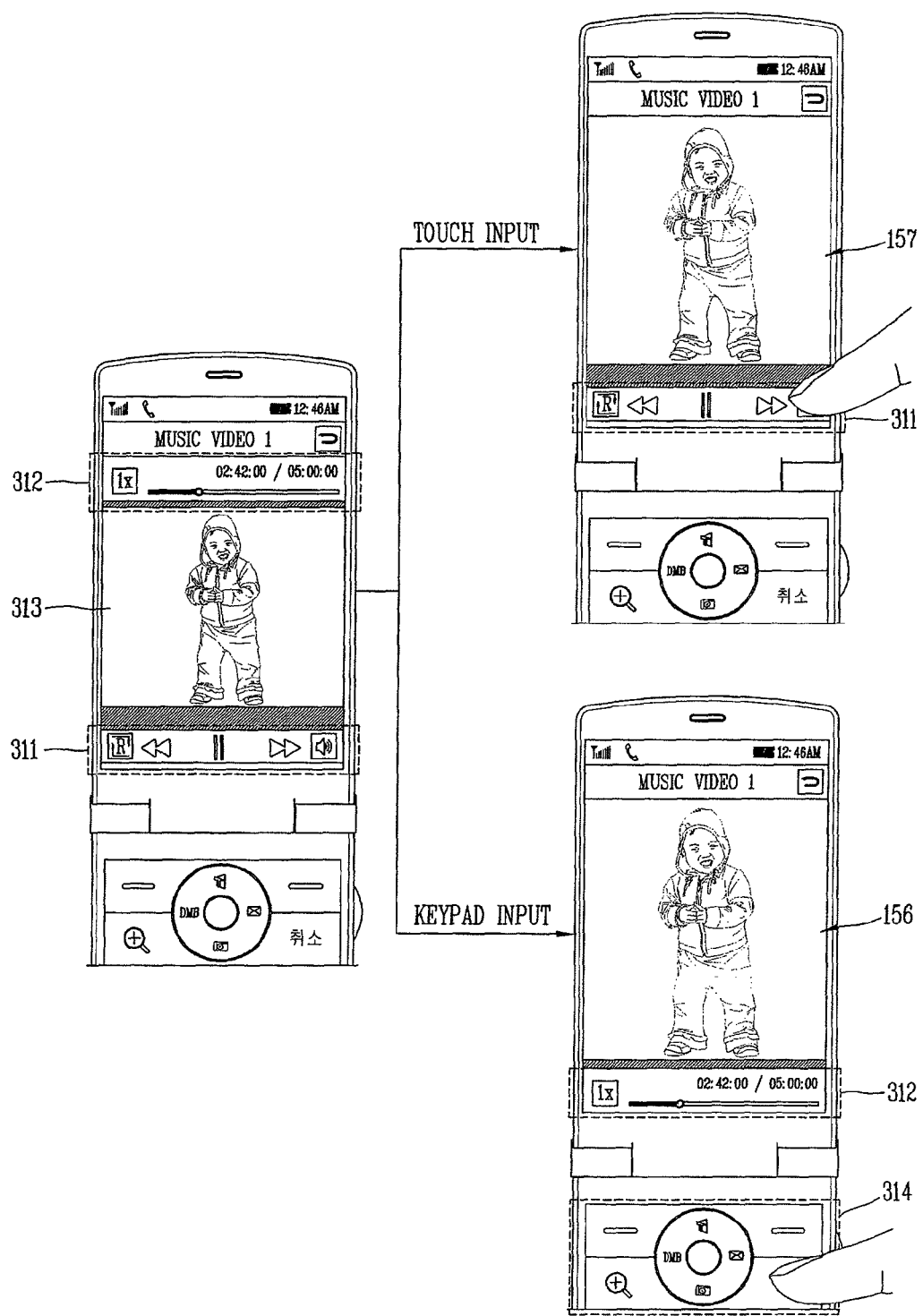
FIG. 26 is an exemplary view for explaining an object selection method using a touch and a keypad in a mobile terminal having an overlapped display structure according to the present invention.

FIG. 26 is an exemplary view for explaining an object selection method using a touch and a keypad in a mobile terminal having an overlapped display structure according to the present invention.

As illustrated in the drawing, if a first object displayed on the first display and a second object displayed on the second display are displayed in an overlapped manner, then the user may select an object (for example, first object) displayed on either one display (for example, first display) using a hardware input means (for example, keypad) without any touch.

For example, assuming that a MP3 music or video is reproduced in a mobile terminal, a plurality of control buttons 311, 312 may be displayed on the screen. At this time, in order to solve a problem that a region 313 for displaying information to display the control button is decreased, the control buttons may be divided into a first display 156 and a second display 157 and displayed in an overlapped manner. As described above, control buttons are displayed in an overlapped manner, thereby relatively increasing a region 313 for displaying the information.

To this, if the user touches his or her desired control button among control buttons (=second objects) 311 displayed on the second display 157, then controller 180 may select and implement the control button. Moreover, according to the present invention, the user may enter a keypad 314 to select a desired button among control buttons (=first objects) 312 displayed on the first display to be overlapped with a control button displayed on the second display. In other words, the user can select a first object displayed on the first display 156 using a keypad 314 input, and select as second object displayed on the second display 157 using a touch input.

On the other hand, a touch pad (not shown) may be adhered to the keypad, and the user can select a first object displayed on the first display by touching a button of the keypad even without pressing the button of the keypad when a touch pad is adhered to the keypad as described above. Furthermore, a second object displayed on the second display may be selected by performing a touch input to the second display as previously described.

In the above embodiment, there has been described a method of selecting an object displayed on the first display using a keypad and selecting an object displayed on the second display using a touch, but an object displayed on the second display can be selected by using a keypad and an object displayed on the first display can be selected by using a touch.

Figure 27A:
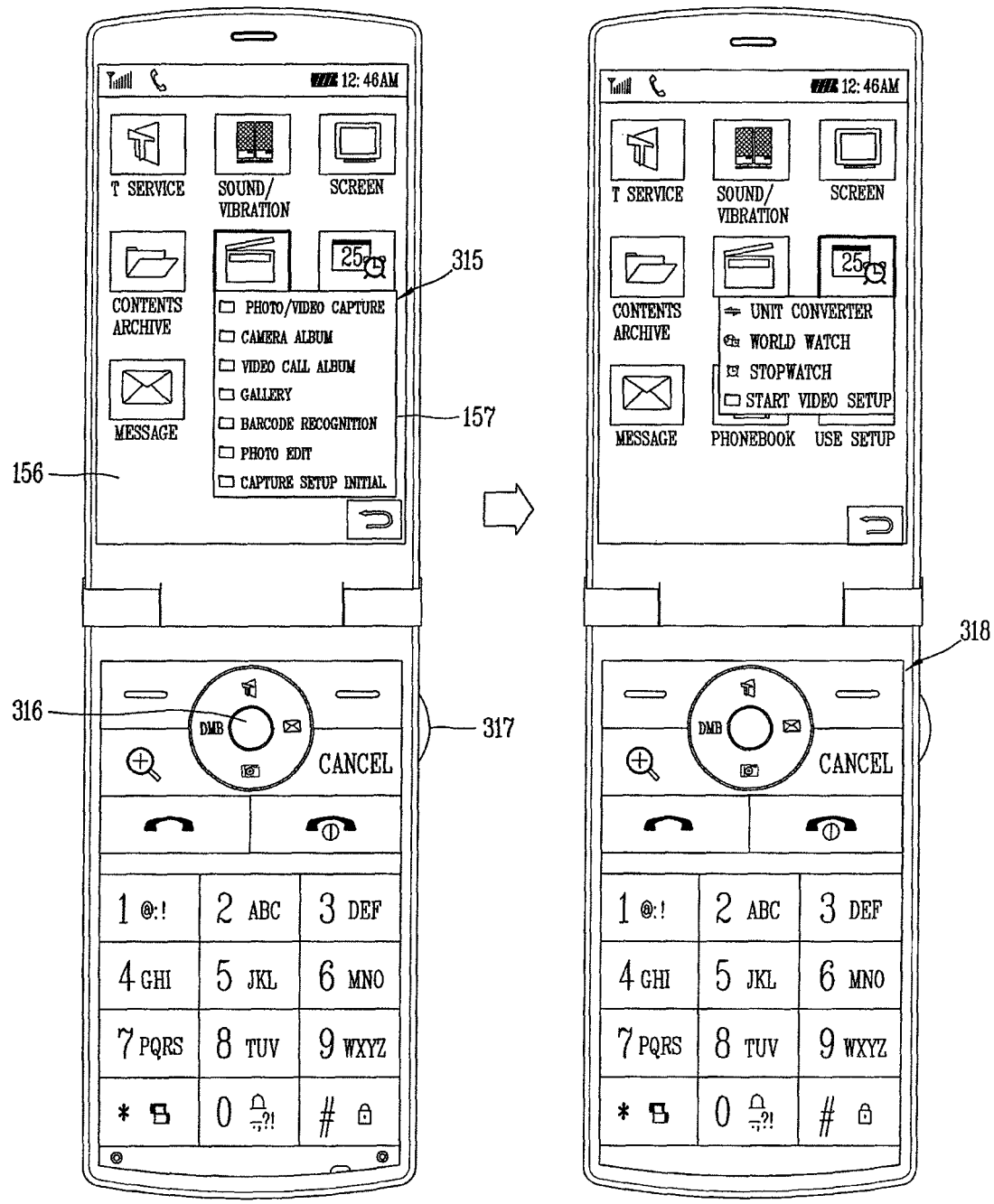
FIGS. 27A and 27B are exemplary views for explaining an object selection method using a touch and a specific input unit in a mobile terminal having an overlapped display structure according to the present invention.
Figure 27B:
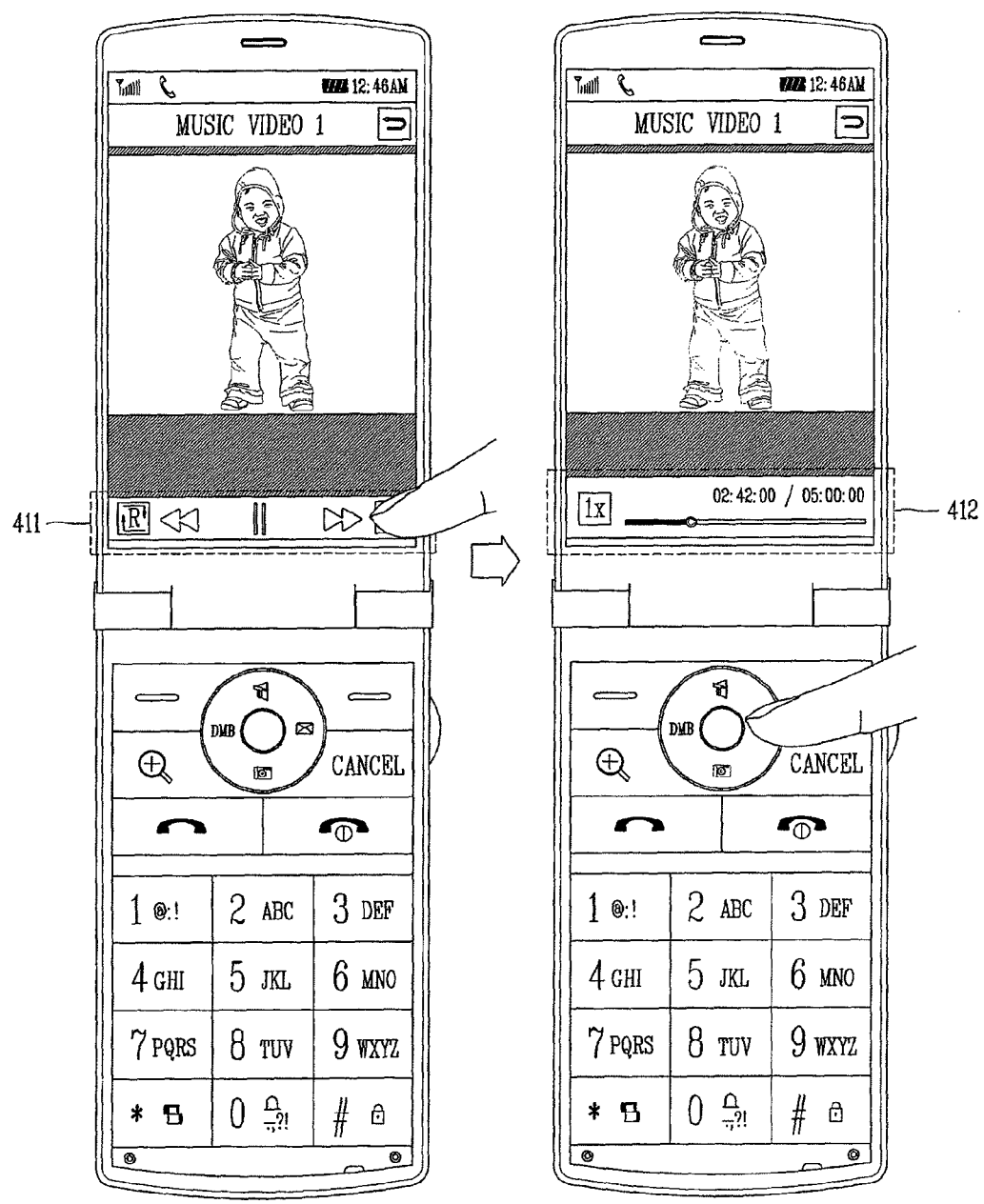

FIGS. 27A and 27B are exemplary views for explaining an object selection method using a touch and a specific input unit in a mobile terminal having an overlapped display structure according to the present invention.

As illustrated in the drawing, if a first object displayed on the first display and a second object displayed on the second display are displayed in an overlapped manner, then the user may select an object (for example, first object) displayed on either one display (for example, first display) using a specific input means (for example, a jog wheel, a trackball, a joystick, etc.)

For example, as illustrated in FIG. 27A, it is assumed that a main menu list which is a first object is displayed on the first display 156, and a sub-menu list which is a second object is displayed on the second display 157. Also, it is assumed that the user selects a specific menu item (for example, multimedia) from a main menu list displayed on the first display to display the sub-menu list on the second display. To this, the user may touch and select his or her desired sub-menu item from a sub-menu list displayed on the second display in a preset manner (315).

However, if a desired main menu item is selected from a main menu list displayed on the first display to be overlapped with the sub-menu list, then the user may use a specific input means (for example, a jog wheel, a trackball, a joystick, etc.) provided in a mobile terminal. By manipulating the specific input means 316, 317, one of the first objects (for example, main menu icons) displayed on the first display may be selected (318).

Furthermore, as illustrated in FIG. 27B, if buttons 411, 412 for controlling a specific application (for example, playing video, photo album, playing music, etc.) are divided into a first display and a second display to be displayed in an overlapped manner, then the user may perform a touch input and select his or her desired control button among the control buttons 411 displayed on the second display. Furthermore, the user may select his or her desired button among the control buttons 412 displayed on the first display to be overlapped with the control buttons displayed on the second display using a specific input means (for example, a jog wheel, a trackball, a joystick, etc.)

In the foregoing embodiment, there has been described a method of selecting an object displayed on the first display using a specific input means, and selecting an object displayed on the second display using a touch. However, according to its option setting, an object displayed on the second display may be selected by using a specific input means, and an object displayed on the first display may be selected by using a touch.

Figure 28A:
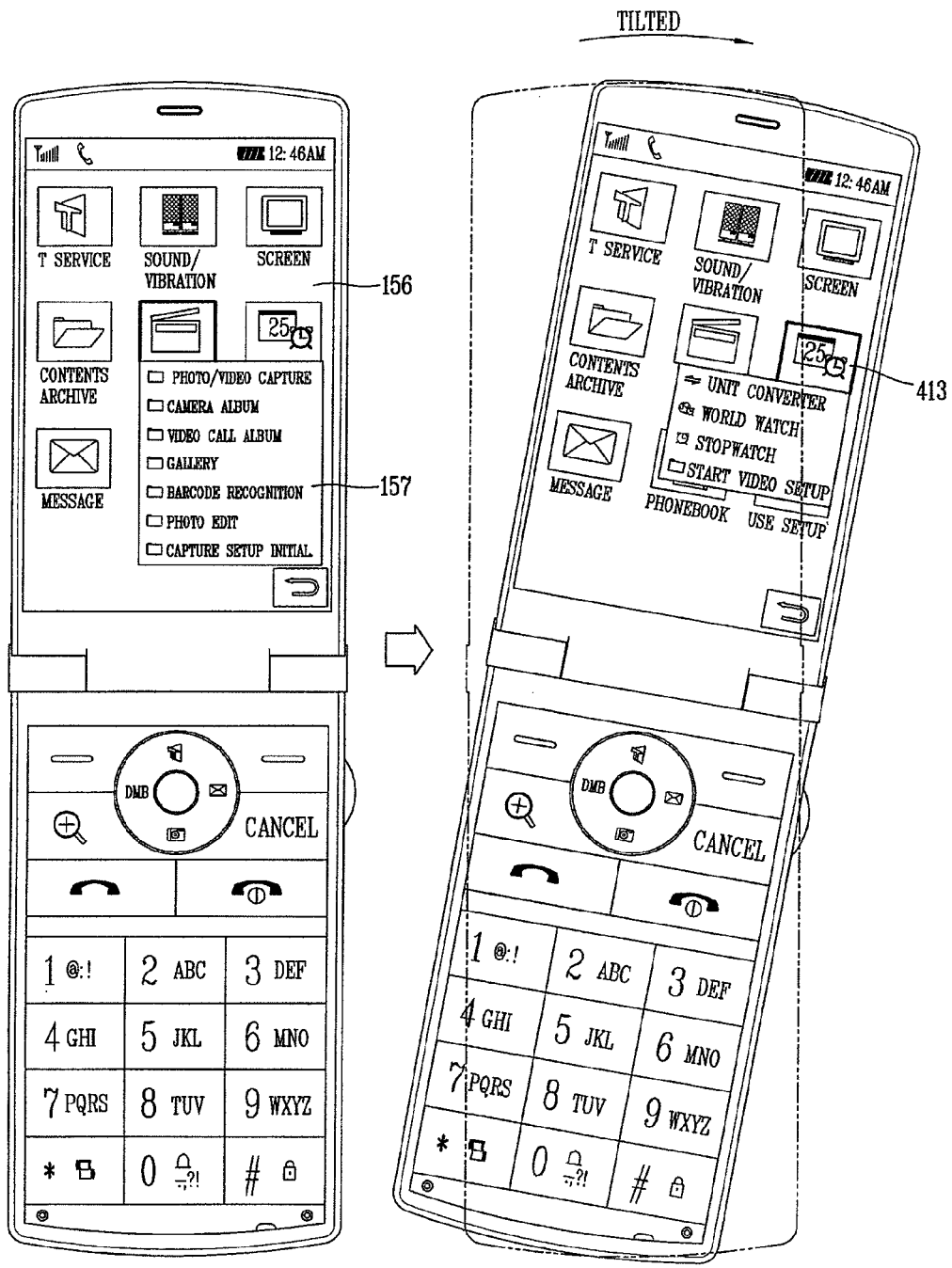
FIGS. 28A and 28B are exemplary views for explaining an object selection method using a touch and an inclination sensor in a mobile terminal having an overlapped display structure according to the present invention.
Figure 28B:
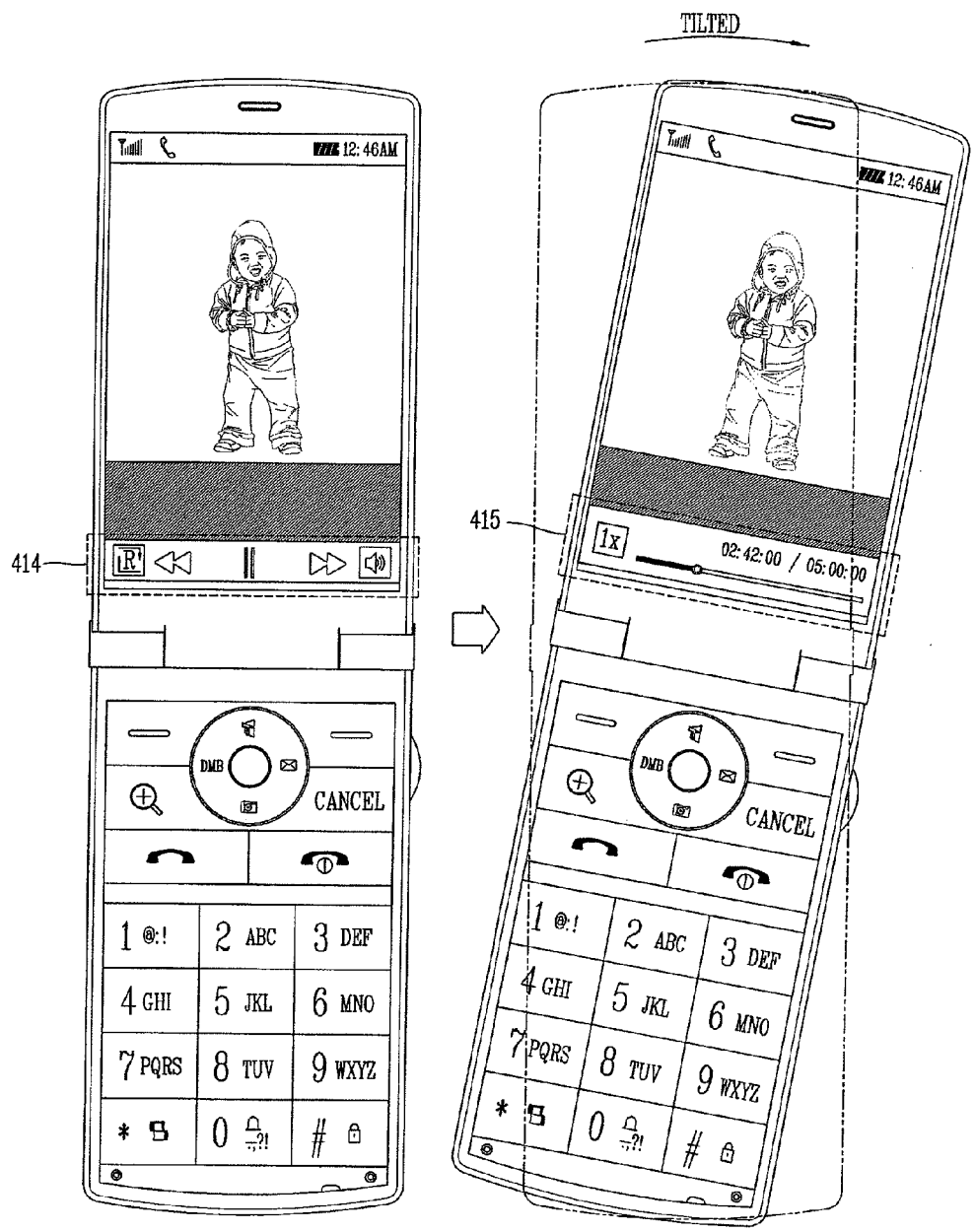

FIGS. 28A and 28B are exemplary views for explaining an object selection method using a touch and an inclination sensor in a mobile terminal having an overlapped display structure according to the present invention.

Hereinafter, according to the present invention, tilt is set to a direction desired to control by the user, which is one side direction around the reference axis when a mobile terminal is tilted in an arbitrary direction (for example, downward direction). For example, the mobile terminal performs an operation like entering a left direction key if the left direction of the mobile terminal faces downward, and performs an operation like entering a right direction key if the right direction of the mobile terminal faces downward. Also, the tilt angle may be set to correspond to the input speed of a direction key. For example, the mobile terminal performs an operation like entering a direction key at high speed if the tilt angle is large, and performs an operation like entering a direction key at low speed if the tilt angle is small.

Furthermore, movement performs an operation like entering a direction key corresponding to the moved direction when the mobile terminal is moved for a specific distance in a specific direction, and in a specific strength or speed. For example, an operation like entering a left direction key is performed if the mobile terminal is moved to the left and an operation like entering a right direction key is performed if the mobile terminal is moved to the right.

As illustrated in the drawing, if a first object displayed on the first display and a second object displayed on the second display are displayed in an overlapped manner, then the user may select an object displayed on either one display using a touch, and select an object displayed on the other display using the tilt or movement of the mobile terminal.

For example, as illustrated in FIG. 28A, it is assumed that a main menu list which is a first object is displayed on the first display 156, and a sub-menu list which is a second object is displayed on the second display 157. Also, it is assumed that the user selects a specific menu item (for example, multimedia) from the main menu list displayed on the first display to display the sub-menu list on the second display.

To this, the user may touch and select his or her desired sub-menu item from the sub-menu list displayed on the second display using a touch input method in a preset manner. Furthermore, the user may move or tilt the mobile terminal in a specific direction to select his or her desired main menu item from the main menu list displayed on the first display to be overlapped with the sub-menu list. By moving or tilting the mobile terminal in a specific direction, one of the first objects (for example, main menu icons) displayed on the first display may be selected (413).

Furthermore, as illustrated in FIG. 28B, if buttons for controlling a specific application (for example, playing video, photo album, playing music, etc.) are divided into a first display and a second display to be displayed in an overlapped manner, then the user may touch and select his or her desired control button among the control buttons 414 displayed on the second display. Also, the user may select his or her desired button by tilting or moving the mobile terminal in a specific direction among the control buttons 415 displayed on the first display.

In the foregoing embodiment, there has been described a method of selecting an object displayed on the first display using tilt or movement, and selecting an object displayed on the second display using a touch. However, according to its option setting, an object displayed on the second display may be selected by using tilt or movement, and an object displayed on the first display may be selected by using a touch.

Figure 29:
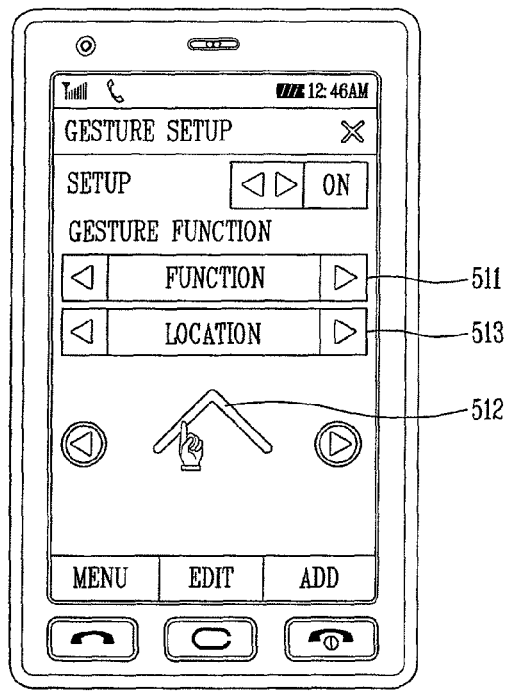
FIG. 29 is an exemplary view for explaining a touch gesture setting method for selecting an object in a mobile terminal having an overlapped display structure according to the present invention.

FIG. 29 is an exemplary view for explaining a touch gesture setting method for selecting an object in a mobile terminal having an overlapped display structure according to the present invention.

In this embodiment, a touch gesture denotes inputting a touch in a specific shape desired by the user. For example, it may be a shape that can be continuously drawn at a time without releasing a touch (namely, without being disconnected), such as an arrow (< >), a circle (○), a curve (~), and a slant (/), or may be a shape that can be drawn by additionally inputting a touch gesture immediately within a specific time period even if the touch is released.

In general, a drag is an operation for selecting a specific object in a touch manner to move to a desired location, thereby being distinguished from the touch gesture. In other words, the touch gesture is operated as a kind of hot key for implementing a specific preset function.

As illustrated in the drawing, the touch gesture may be individually configured based on each function. In other words, the user first selects a function 511 for setting up a touch gesture, and then enters and stores a touch gesture 512 and an input location 513 corresponding to the function. To this, the controller 180 determines and stores the shape, input direction and the like of the entered touch gesture. Here, the configuration of a user interface for setting up the touch gesture may be different based on each mobile terminal.

The shape of a touch gesture is of course important, but a location (for example, a left side, a right side, an upper side and a lower side regions into which the region of a screen is divided) into which the touch gesture is entered, a size of the touch gesture, or a direction (starting from the left side to the right side, starting from the right side to the left side, starting from the upper side to the lower side or starting from the lower side to the upper side) in which the touch gesture is entered may be additionally set up as an option.

Figure 30:
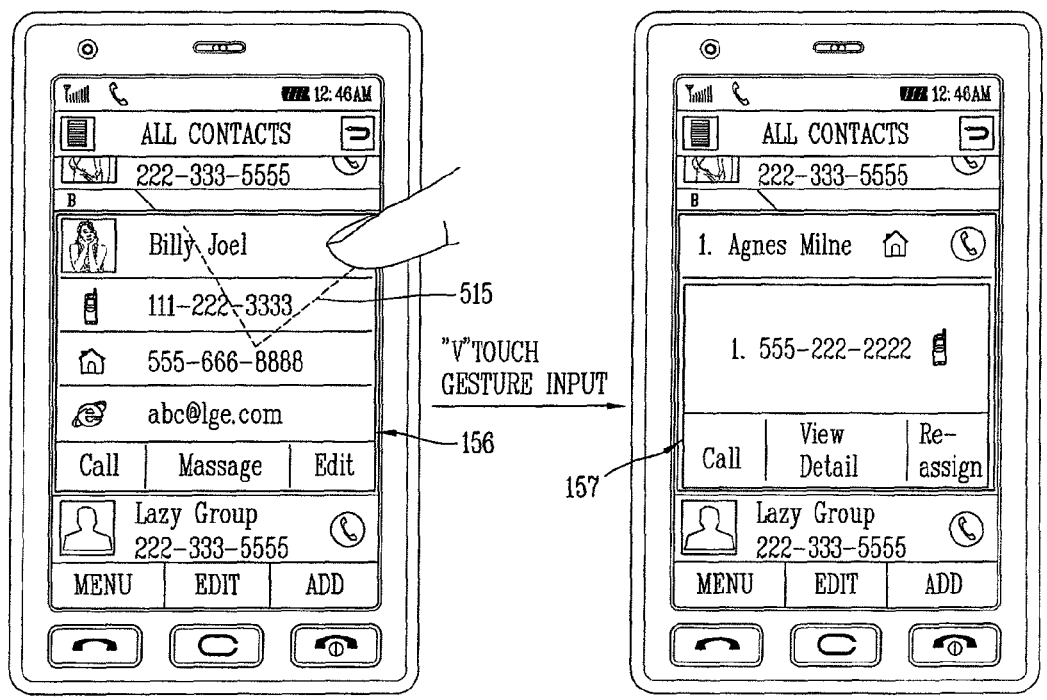
FIG. 30 is an exemplary view for explaining an object selection method using a touch gesture in a mobile terminal having an overlapped display structure according to the present invention.

FIG. 30 is an exemplary view for explaining an object selection method using a touch gesture in a mobile terminal having an overlapped display structure according to the present invention.

As described above, it is assumed that a touch gesture corresponding to each function has been set up. The user may input a first touch gesture for selecting a first object displayed on the first display. Also, the user may input a second touch gesture for selecting a second object displayed on the second display. As a result, the controller 180 may distinguish the entered touch gesture to select and implement only the relevant object among objects displayed on the first or the second display.

For example, it is assumed that a phonebook list is displayed on the first display 156 and information of the counterpart currently on the phone is displayed on the second display 157. To this, the user may select objects displayed on the second display with any one of the foregoing object selection methods (for example, using a touch, input unit, or tilt)

Furthermore, if a specific preset touch gesture 515 is entered, then objects displayed on the first display may be displayed and the user may select any one of the displayed objects. In other words, objects of the first and the second display are selectively displayed according to the touch gesture, thereby allowing the user to select his or her desired object using any one of the foregoing object selection methods. In other words, the touch gesture may be used as a function for selecting any one of objects only currently displayed on the first or the second display.

According to another embodiment, a specific preset touch gesture may be entered to be used as a hot key, thereby allowing the user to immediately implement another preset function, which is not an object displayed on the first or the second display.

Figure 31A:
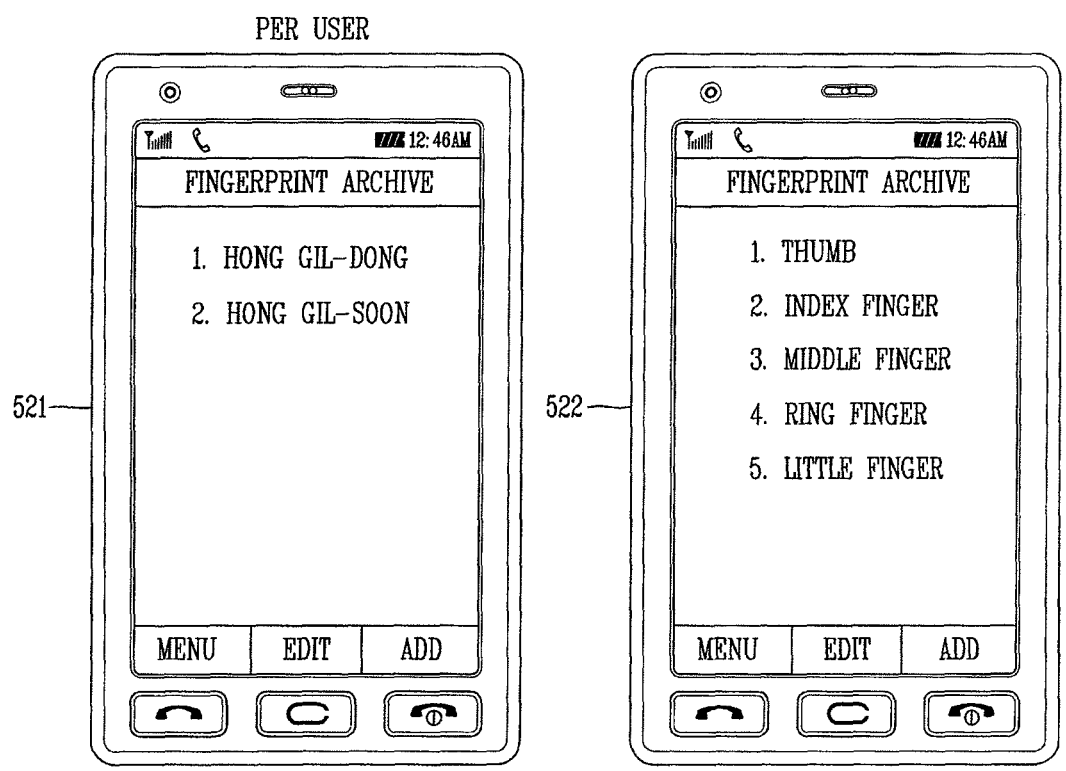
FIGS. 31A and 31B are exemplary views for explaining an object selection method using a fingerprint in a mobile terminal having an overlapped display structure according to the present invention.
Figure 31B:
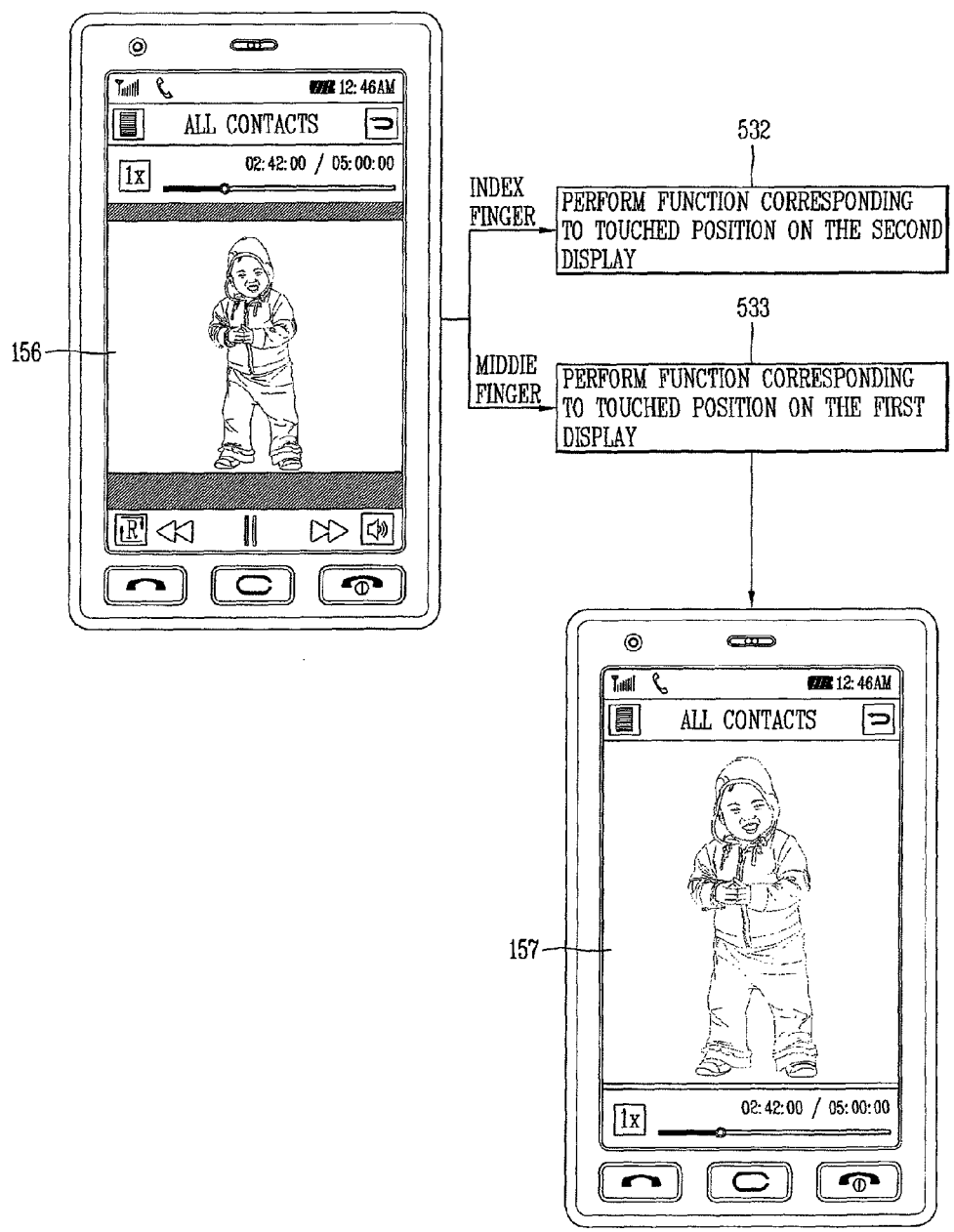

FIGS. 31A and 31B are exemplary views for explaining an object selection method using a fingerprint in a mobile terminal having an overlapped display structure according to the present invention.

According to this embodiment, there will be described a method in which a photo sensor (not shown) for scanning a fingerprint is incorporated in the display unit, thereby allowing the user to immediately scan the fingerprint in the display unit, and implement a specific preset function according to the scanned fingerprint.

In general, a separate fingerprint recognition sensor is provided in a mobile terminal in the related art, but in this embodiment, it is configured to immediately scan a fingerprint in the display unit, and then the user's fingerprint being touched to the display unit is detected to implement the relevant function according to the touched fingerprint. Here, the configuration for scanning a fingerprint may be a type in which a photo sensor (not shown) is inserted in the LCD, a type in which a photo sensor is covered on an upper side of the LCD, or a type in which a transparent scan film (not shown) is overlapped and adhered to the LCD.

As illustrated in the drawing, the fingerprint may be set up individually for each function. However, the number of fingers including both hands are ten, and therefore, the number of functions corresponding to each fingerprint will be limited to ten at most. On the other hand, if the user using the same mobile terminal exists additionally, then different functions may be set up for the fingerprints of each user, respectively.

As illustrated in FIG. 31A, the user sets up a user for registering his or her fingerprint (521). The user may be further added or the user that has been previously stored may be edited. Subsequent to selecting the user as described above, a finger for inputting the fingerprint may be selected (522). Subsequent to selecting a finger as described above, the fingerprint is registered therein. Then, a function to be implemented when scanning each fingerprint will be entered and stored.

As described above, it is assumed that fingerprints corresponding to each function have been set up. The user may put a first finger (for example, index finger) to touch the second display which is an upper display to select a first object displayed on the first display. Then, the user may immediately select any one of second objects displayed on the second display. On the other hand, the controller 180 may distinguish a fingerprint being touched to the upper display to select and implement the relevant object among objects displayed on the first or the second display or the relevant object among objects that are not currently displayed on the first or the second display.

Furthermore, according to the foregoing embodiment, functions corresponding to each fingerprint are set up to perform an operation like entering a hot key. However, a finger for selecting an object displayed on the first display, or a finger for selecting an object displayed on the second display may be set up to be used.

For example, as illustrated in FIG. 31B, it is assumed that an object of the first display can be selected by using a first fingerprint (for example, index finger) and an object of the second display can be selected by using a second fingerprint (for example, thumb). Then, if control buttons for controlling a specific application (for example, playing video, photo album, playing music, etc.) are divided into a first display 156 and a second display 157 to be displayed in an overlapped manner, then the user may touch and select his or her desired control button among control buttons displayed on the second display using a thumb (532), and touch and select a control button displayed on the first display using an index finger (533).

Figure 32:
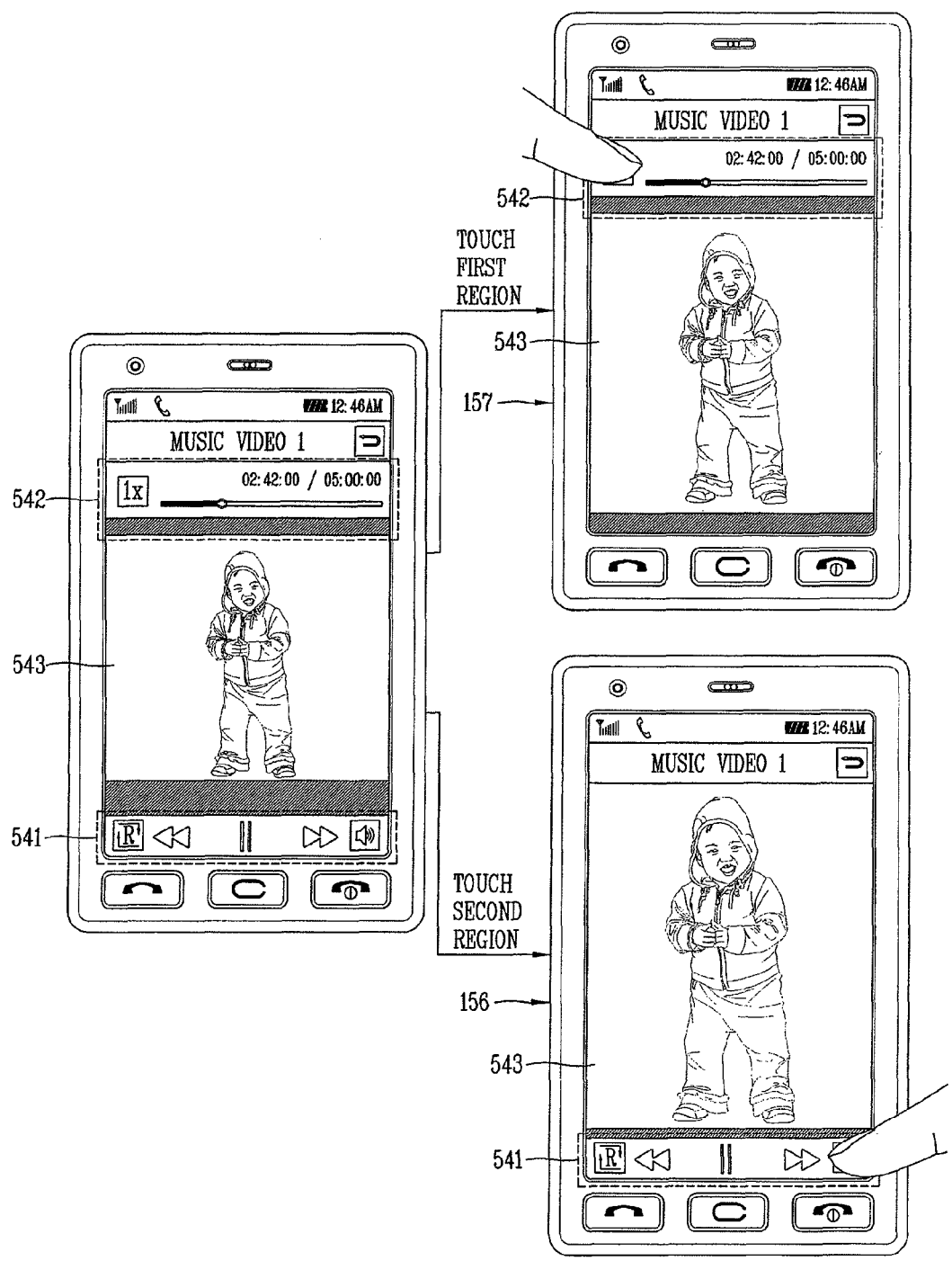
FIG. 32 is an exemplary view for explaining an object selection method using a touch region in a mobile terminal having an overlapped display structure according to the present invention.

FIG. 32 is an exemplary view for explaining an object selection method based on a touch region in a mobile terminal having an overlapped display structure according to the present invention.

As illustrated in the drawing, if a first object displayed on the first display and a second object displayed on the second display are displayed in an overlapped manner, then a touch region can be divided into at least two, thereby allowing the user to select an object displayed on the first display 156 by touching one side region 541 and select an object displayed on the second display 157 by touching another side region 542.

For example, assuming that a MP3 music or video is reproduced in a mobile terminal, a plurality of control buttons may be displayed on the screen. A region for displaying specific information (for example, video) is decreased as increasing the number of displayed control buttons. As a result, in a mobile terminal having an overlapped display structure as in the present invention, a display region may be divided (for example, a first region, a second region), and then the control buttons may be divided and displayed in each region.

Furthermore, when different functions are implemented on the first display and the second display, then a display region may be divided (for example, a first region, a second region), and accordingly, buttons for controlling the functions displayed on the first or the second display may be divided to be displayed in each region.

To this, if the user touches any one of the divided display regions, then the controller 180 may display the touched display region. Furthermore, the controller 180 may display control buttons (=objects) configured in the display region. If the touched display region is displayed as described above, then the location of a region for displaying the specific information (for example, video) may be moved. For example, if the user touches an upper side display region 542, then control buttons for controlling functions displayed on the second display 157 are displayed on the upper side display region, and a region 543 for displaying specific information is widened in a downward direction. Furthermore, if the user touches a lower side display region 541, then control buttons for controlling functions displayed on the first display 156 are displayed on the lower side display region, and a region 543 for displaying specific information is widened in an upward direction.

Furthermore, according to an embodiment of the present invention, the foregoing method may be implemented as codes readable by a computer on a medium written by the program. Examples of the computer-readable media may include ROM, RAM, CD-ROM, magnetic tape, floppy disk, and optical data storage device, and the like, and also include a device implemented in the form of a carrier wave (for example, transmission via the Internet).

According to a mobile communication terminal having an electronic paper and a control method applied thereto as described above, the configurations and methods according to the above-described embodiments will not be applicable in a limited way, and all or part of each embodiment may be selectively combined and configured to make various modifications thereto.

What is claimed is:

1. A mobile terminal, comprising:
 a touch pad;
 a first display unit including a transparent display;
 a second display unit including a non-transparent display disposed below the transparent display; and
 a controller configured to selectively control the first and second display units to operate in a dual-operation mode by controlling at least a portion of the first display unit to be transparent and not display information and controlling the second display unit to display information that can be viewed through said at least the portion of the first display unit that is transparent,
 wherein the controller is further configured to control the first and second display units to operate in a single-operation mode by controlling one of the first and second display units to operate and the other one of the first and second display units not to operate.

2. The mobile terminal of claim 1, wherein said at least the portion of the first display unit that is transparent is one of a) all of the first display unit such that the information displayed on the second display unit can be viewed in a full screen, b) only a partial portion of the first display unit such that the information displayed by both the first and second display units is displayed in a split screen.

3. The mobile terminal of claim 1, wherein said at least the portion of the first display unit that is transparent can be enlarged or reduced by a touch and drag gesture along the first display unit.

4. The mobile terminal of claim 1, wherein the touch pad is disposed between the transparent display and the non-transparent display.

5. The mobile terminal of claim 1, wherein the controller controls the first and second display units to operate in the dual-operation mode based on predetermined inputs to the mobile terminal including at least one of a touch action corresponding to the first or second display units, a predetermined manipulation of a hard key on the terminal, voice activation, and a proximity touch input corresponding to the first or second display units.

6. The mobile terminal of claim 1, wherein when the first display unit is operating in the single-operation mode including displaying image data and text data and a predetermined input has occurred on the mobile terminal, the controller is further configured to control the first and second display units to operate in the dual-operation mode and to split the displaying of the image data and the text data by displaying the text data on the second display unit and the image data on the first display unit.

7. The mobile terminal of claim 1, wherein when the first display unit is operating in the single-operation mode including displaying image data and text data and a predetermined input has occurred on the mobile terminal, the controller is further configured to control the first and second display units to operate in the dual-operation mode and to display both the image data and the text data as 3-D data on a portion of the first display unit, and to display only the text data on the second display unit.

8. The mobile terminal of claim 1, wherein when the second display unit is operating in the single-operation mode including displaying text data including a list of menu icons that can be selected to perform a corresponding application, and a predetermined input has occurred for one of the listed menu icons, the controller is further configured to control the first and second display units to operate in the dual-operation mode and to display information corresponding to the executed application on said at least the portion of the first display unit.

9. The mobile terminal of claim 8, wherein the controller is further configured to display the information corresponding to the executed application as appearing to be rotating on the first display unit.

10. The mobile terminal of claim 1, wherein when the controller controls the first and second display units to operate in the dual-operation mode, the controller is further configured to control the first display unit to display a first object and the second display unit to display a second object, and to select the first object when the first object is selected on the first display unit and to select the second object when the first display unit is touched at a position corresponding to the second object displayed on the second display unit.

11. The mobile terminal of claim 1, wherein when the controller controls the first and second display units to operate in the dual-operation mode, the controller is further configured to control the first display unit to display a first object and the second display unit to display a second object overlapping the first object, and to select one of the first or second objects based on at least one of 1) an amount of pressure touched on the first and second objects, 2) a length of time the first and second objects are touched and 3) whether a front surface of the first display unit is touched or a rear surface of the second display unit is touched, 4) a combination of touch inputs and mechanical key inputs, 5) a titling action of the mobile terminal, 6) a predetermined touch gesture on the first or second display units, and 7) a specific finger of a user touching the first or second display units.

12. A method of controlling a mobile terminal including a touch pad; a first display unit including a transparent display; and a second display unit including a non-transparent display disposed below the transparent display, the method comprising:
 selectively controlling, via a controller on the mobile terminal, the first and second display units to operate in a dual-operation mode by controlling at least a portion of the first display unit to be transparent and not display information and controlling the second display unit to display information that can be viewed through said at least the portion of the first display unit that is transparent, and controlling, via the controller, the first and second display units to operate in a single-operation mode by controlling one of the first and second display units to operate and the other one of the first and second display units not to operate.

13. The method of claim 12, wherein said at least the portion of the first display unit that is transparent is one of a) all of the first display unit such that the information displayed on the second display unit can be viewed in a full screen, b) only a partial portion of the first display unit such that the information displayed by both the first and second display units is displayed in a split screen.

14. The method of claim 12, wherein said at least the portion of the first display unit that is transparent can be enlarged or reduced by a touch and drag gesture along the first display unit.

15. The method of claim 12, wherein the touch pad is disposed between the transparent display and the non-transparent display.

16. The method of claim 12, wherein the controlling step controls the first and second display units to operate in the dual-operation mode based on predetermined inputs to the mobile terminal including at least one of a touch action corresponding to the first or second display units, a predetermined manipulation of a hard key on the terminal, voice activation, and a proximity touch input corresponding to the first or second display units.

17. The method of claim 12, wherein when the first display unit is operating in the single-operation mode including displaying image data and text data and a predetermined input has occurred on the mobile terminal, the method further comprises controlling the first and second display units to operate in the dual-operation mode and to split the displaying of the image data and the text data by displaying the text data on the second display unit and the image data on the first display unit.

18. The method of claim 12, wherein when the first display unit is operating in the single-operation mode including displaying image data and text data and a predetermined input has occurred on the mobile terminal, the method further comprises controlling the first and second display units to operate in the dual-operation mode and to display both the image data and the text data as 3-D data on a portion of the first display unit, and to display only the text data on the second display unit.

19. The method of claim 12, wherein when the second display unit is operating in the single-operation mode including displaying text data including a list of menu icons that can be selected to perform a corresponding application, and a predeteimined input has occurred for one of the listed menu icons, the method further comprises controlling the first and second display units to operate in the dual-operation mode and to display information corresponding to the executed application on said at least the portion of the first display unit.

20. The method of claim 19, further comprising:
controlling the first display unit to display the information corresponding to the executed application as appearing to be rotating on the first display unit.

21. The method of claim 12, wherein when the controller step controls the first and second display units to control in the dual-operation mode, the method further comprises controlling the first display unit to display a first object and the second display unit to display a second object, and to select the first object when the first object is selected on the first display unit and to select the second object when the first display unit is touched at a position corresponding to the second object displayed on the second display unit.

22. The method of claim 12, wherein when the controller step controls the first and second display units to operate in the dual-operation mode, the method further comprises controlling the first display unit to display a first object and the second display unit to display a second object overlapping the first object, and to select one of the first or second objects based on at least one of 1) an amount of pressure touched on the first and second objects, 2) a length of time the first and second objects are touched and 3) whether a front surface of the first display unit is touched or a rear surface of the second display unit is touched, 4) a combination of touch inputs and mechanical key inputs, 5) a titling action of the mobile terminal, 6) a predetermined touch gesture on the first or second display units, and 7) a specific finger of a user touching the first or second display units.

* * * * *